United States Patent
Heckmeier et al.

(10) Patent No.: US 7,001,646 B2
(45) Date of Patent: *Feb. 21, 2006

(54) LIQUID CRYSTALLINE MEDIUM

(75) Inventors: Michael Heckmeier, Bensheim (DE); Brigitte Schuler, Grossostheim (DE); Achim Goetz, Haehnlein (DE); Peer Kirsch, Darmstadt (DE); Eike Poetsch, Muehltal (DE); Detlef Pauluth, Ober-Ramstadt (DE)

(73) Assignee: Merck Patent GmbH, Darmstadt (DE)

( * ) Notice: Subject to any disclaimer, the term of this patent is extended or adjusted under 35 U.S.C. 154(b) by 85 days.

This patent is subject to a terminal disclaimer.

(21) Appl. No.: 10/168,335

(22) PCT Filed: Dec. 18, 2000

(86) PCT No.: PCT/EP00/12891

§ 371 (c)(1), (2), (4) Date: Jun. 20, 2002

(87) PCT Pub. No.: WO01/46336

PCT Pub. Date: Jun. 28, 2001

(65) Prior Publication Data

US 2003/0134056 A1 Jul. 17, 2003

(30) Foreign Application Priority Data

Dec. 21, 1999 (DE) .......................... 199 61 702

(51) Int. Cl.
- C09K 19/30 (2006.01)
- C09K 19/34 (2006.01)
- C09K 19/12 (2006.01)
- C09K 19/20 (2006.01)

(52) U.S. Cl. ............. 428/1.1; 252/299.61; 252/299.63; 252/299.66; 252/299.67

(58) Field of Classification Search ............... 428/1.1; 252/299.61, 299.63, 299.66, 299.67, 299.01
See application file for complete search history.

(56) References Cited

U.S. PATENT DOCUMENTS

| | | | | |
|---|---|---|---|---|
| 5,728,319 A | * | 3/1998 | Matsui et al. ......... | 252/299.63 |
| 5,792,386 A | * | 8/1998 | Matsui et al. ......... | 252/299.01 |
| 5,858,270 A | * | 1/1999 | Matsui et al. ......... | 252/299.01 |
| 5,993,692 A | * | 11/1999 | Tarumi et al. | |
| 6,592,951 B1 | * | 7/2003 | Heckmeier et al. ......... | 428/1.1 |
| 6,790,488 B1 | * | 9/2004 | Nakajima et al. ............ | 428/1.1 |
| 6,846,523 B1 | * | 1/2005 | Manabe et al. .............. | 428/1.1 |

FOREIGN PATENT DOCUMENTS

| | | |
|---|---|---|
| DE | 100 02 462 | 5/2000 |
| EP | 0 786 445 | 7/1997 |
| EP | 0 786 508 | 7/1997 |
| EP | 0 786 509 | 7/1997 |
| EP | 1 002 848 | 5/2000 |

\* cited by examiner

Primary Examiner—Shean C. Wu
(74) Attorney, Agent, or Firm—Millen, White, Zelano, Branigan, P.C.

(57) ABSTRACT

The invention relates to a liquid crystalline medium based on a mixture of polar compounds with positive dielectric anisotropy, characterized in that said medium contains one or more alkenyl compounds of the formula (I) and one or more compounds of the formula (IA) wherein R, $R^1$, $R^2$, ring A and ring B, $L^1$, $L^2$; $L^3$; $L^4$; X, $Z^1$, $Z^2$, y and z have the meanings cited in Claim 1.

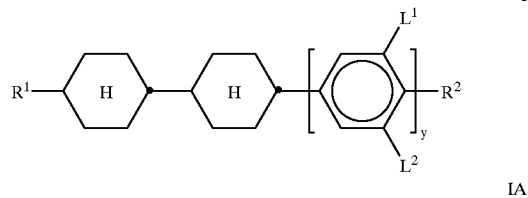

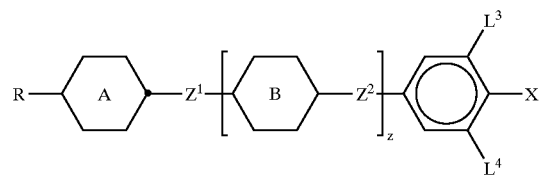

29 Claims, No Drawings

LIQUID CRYSTALLINE MEDIUM

The present invention relates to a liquid-crystalline medium, to the use thereof for electro-optical purposes, and to displays containing this medium.

Liquid crystals are used, in particular, as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and give short addressing times, low threshold voltages and high contrast in the cells.

They should furthermore have a suitable mesophase, for example a nematic or cholesteric mesophase for the above-mentioned cells, at conventional operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high resistivity, good UV and temperature stability and low vapor pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, for example, active elements (i.e. transistors). This is then referred to as an "active matrix", and a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material limits the display size, since even modular assembly of various part-displays results in problems at the joints.

In the case of more promising type 2, which is preferred, the electro-optical effect used is usually the TN effect. A distinction is made between two technologies: TFTs comprising compound semiconductors, for example CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully color-compatible displays, in which a mosaic of red, green and blue filters is arranged in such a way that each filter element is located opposite a switchable pixel.

The TFT displays usually operate as TN cells with crossed polarizers in transmission and are backlit.

The term MLC displays here covers any matrix display containing integrated non-linear elements, i.e., besides the active matrix, also displays containing passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to inadequate resistivity of the liquid-crystal mixtures [TOGASHI, S., SEKOGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display drops, and the problem of after-image elimination can occur. Since the resistivity of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high resistivity values. It is furthermore important that the resistivity increases as little as possible with increasing temperature and after heating and/or UV exposure. The low-temperature properties of the mixtures of the prior art are also particularly disadvantageous. It is required that crystallization and/or smectic phases do not occur, even at low temperatures, and that the temperature dependence of the viscosity is as low as possible. The MLC displays of the prior art thus do not satisfy today's requirements.

There thus continues to be a great demand for MLC displays which have very high resistivity at the same time as a broad operating temperature range, short response times, even at low temperatures, and a low threshold voltage, and which do not have these disadvantages, or only do so to a reduced extent.

In TN (Schadt-Helfrich) cells, media are desired which facilitate the following advantages in the cells:
expanded nematic phase range (in particular down to low temperatures)
storage stability, even at extremely low temperatures
switchability at extremely low temperatures (outdoor use, automobile, avionics)
increased resistance to UV radiation (longer life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further extension of the parameter latitude available (clearing point, smectic-nematic transition or melting point, viscosity, dielectric parameters, elastic parameters) is urgently desired.

It is an object of the invention to provide media in particular for these MLC, TN or STN displays which do not have the abovementioned disadvantages or only do so to a reduced extent, and preferably at the same time have very high resistivity values and low threshold voltages.

It has now been found that the above objects can be achieved by using media according to the invention in displays.

The invention thus relates to a liquid-crystalline medium based on a mixture of polar compounds having positive dielectric anisotropy, characterized in that it comprises one or more alkenyl compounds of the formula I

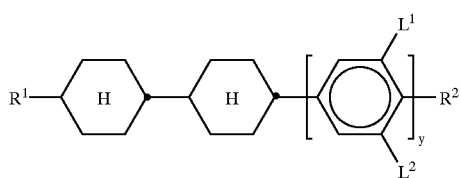

and one or more compounds of the formula IA

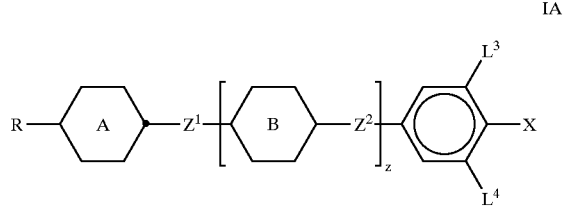

in which the individual radicals have the following meanings:

R is a halogenated or unsubstituted alkyl or alkoxy radical having 1 to 15 carbon atoms, where one or more $CH_2$ groups in these radicals may also, in each case independently of one another, be replaced by —C≡C—, —CH=CH—, —O—, —CO—O— or —O—CO— in such a way that O atoms are not linked directly to one another, $R^1$ is an alkenyl radical having 2 to 7 carbon atoms, $R^2$ is as defined for R or, if y is 1 or 2, is alternatively Q—Y, Q is $CF_2$, $OCF_2$, CFH, OCFH, $OCHFCF_3$, $OCF_2CHFCF_2$ or a single bond, Y is F or Cl, X is F, Cl, CN, a halogenated alkyl radical, a halogenated alkenyl radical, a halogenated alkoxy radical or a halogenated alkenyloxy radical having up to 6 carbon atoms, $Z^1$ and $Z^2$ are each, independently of one another, —$CF_2O$—, —$OCF_2$— or a single bond, where, if Z=1, $Z^1 \neq Z^2$,

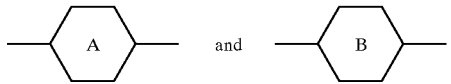

are each, independently of one another

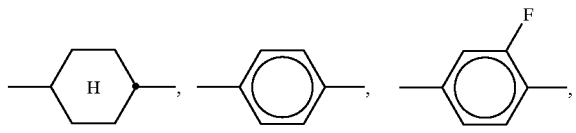

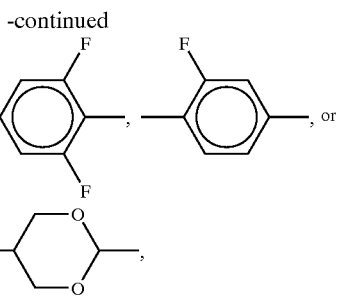

y is 0, 1 or 2, and z is 0 or 1, and $L^1$, $L^2$, $L^3$ and $L^4$ are each, independently of one another, H or F.

The compounds of the formulae I and Ia have a broad range of applications. Depending on the choice of substituents, these compounds can serve as base materials of which liquid-crystalline media are predominantly composed; however, it is also possible to add compounds of the formulae I and IA to liquid-crystalline base materials from other classes of compounds in order, for example, to modify the dielectric and/or optical anisotropy of a dielectric of this type and/or to optimize its threshold voltage and/or its viscosity.

In the pure state, the compounds of the formulae I and IA are colorless and form liquid-crystalline mesophases in a temperature range which is favorable for electro-optical use. They are stable chemically, thermally and to light.

If R is an alkyl radical and/or an alkoxy radical, it can be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R is an alkyl radical in which one $CH_2$ group has been replaced by —CH=CH—, it can be straight-chain or branched. It is preferably straight-chain and has 2 to 10 carbon atoms. Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If R is an alkyl radical in which one $CH_2$ group has been replaced by —O— and one has been replaced by —CO—, these are preferably adjacent. They thus contain an acyloxy group —CO—O— or an oxycarbonyl group —O—CO—. They are preferably straight-chain and have 2 to 6 carbon atoms. They are accordingly in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 2-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If R is an alkyl radical in which one $CH_2$ group has been replaced by unsubstituted or substituted —CH=CH— and an adjacent $CH_2$ group has been replaced by CO or CO—O or O—CO, it can be straight-chain or branched. It is preferably straight-chain and has 4 to 12 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If R is an alkyl or alkenyl radical which is monosubstituted by CN or $CF_3$, this radical is preferably straight-chain. The substitution by CN or $CF_3$ is in any position.

If R is an alkyl or alkenyl radical which is at least monosubstituted by halogen, this radical is preferably straight-chain and halogen is preferably F or Cl. In the case of polysubstitution, halogen is preferably F. The resulting radicals also include perfluorinated radicals. In the case of monosubstitution, the fluoro or chloro substituent can be in any desired position, but is preferably in the ω-position.

Compounds containing branched pendant groups R may occasionally be of importance owing to better solubility in the conventional liquid-crystalline base materials, but in particular as chiral dopants if they are optically active. Smectic compounds of this type are suitable as components for ferroelectric materials.

Branched groups of this type generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If R is an alkyl radical in which two or more $CH_2$ groups have been replaced by —O— and/or —CO—O—, it can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

The compounds of the formulae I and IA are prepared by methods known per se, as described in the literature (for example in the standard works, such as Houben-Weyl, Methoden der Organischen Chemie, Georg-Thieme-Verlag, Stuttgart), to be precise under reaction conditions which are known and suitable for said reactions. Use can also be made here of variants which are known per se, but are not mentioned here in greater detail. The compounds of formula IA are known, for example, from DE-A-40 06 921.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high resistivity which is located in the cell) which contain media of this type, and to the use of these media for electro-optical purposes.

The liquid-crystal mixtures according to the invention allow a significant extension of the parameter latitude which is available. The achievable combinations of clearing point, viscosity at low temperature, thermal and UV stability and dielectric anisotropy are far superior to current prior art materials.

The requirement for a high clearing point, nematic phase at low temperature and high $\Delta\varepsilon$ has hitherto only been achieved inadequately. Although systems such as, for example, ZLI-3119 have a comparable clearing point and comparably favorable viscosities, they have, however, a $\Delta\varepsilon$ of only +3.

Other mixture systems have comparable viscosities and $\Delta\varepsilon$ values, but only clearing points in the region of 60° C.

While retaining the nematic phase down to −20° C., preferably down to −30° C., particularly preferably down to −40° C., and clearing points above 60° C., preferably above 65° C., particularly preferably above 70° C., the liquid-crystal mixtures according to the invention enable dielectric anisotropy values $\Delta\varepsilon$ of $\geq 6$, preferably $\geq 8$, and a high specific resistance value to be achieved simultaneously, allowing excellent STN and MLC displays to be achieved. In particular, the mixtures are characterized by low operating voltages. The TN thresholds are below 2.0 V, preferably below 1.5 V, particularly preferably <1.3 V.

It goes without saying that a suitable choice of the components of the mixtures according to the invention also allows higher clearing points (for example above 110° C.) to be achieved at higher threshold voltages, or lower clearing points to be achieved at lower threshold voltages, while retaining the other advantageous properties. Likewise, mixtures of higher $\Delta\varepsilon$ and thus lower thresholds can be obtained at viscosities which are increased correspondingly little. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favorable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. Thus, significantly higher resistivities can be achieved using the mixtures according to the invention at the first minimum than in the case of mixtures comprising cyano compounds. A person skilled in the art can use simple routine methods to produce the birefringence necessary for a specified layer thickness of the MLC display by suitable choice of the individual components and their proportions by weight.

The flow viscosity $\nu_{20}$ at 20° C. is preferably <60 $mm^2 \cdot s^{-1}$, particularly preferably <50 $mm^2 \cdot s^{-1}$. The rotational viscosity $\gamma_1$ of the mixtures according to the invention at 20° C. is preferably <160 mPa·s, particularly preferably <150 mPa·s. The nematic phase range is preferably at least 90°, in particular at least 100°. This range preferably extends at least from −20° to +80°.

A short response time is desired for liquid-crystal displays. This applies in particular to displays having video reproduction capability. Such displays require response times (sum $t_{on}+t_{off}$) of not more than 25 ms. The upper response time limit is determined by the refresh rate. The response time is not only influenced by the rotational viscosity $\gamma_1$, but also by the tilt angle. In particular, mixtures comprising $\geq 20\%$ of the compounds of formula IA exhibit a tilt angle of >2.5, preferably >3.0, compared to the commercial product ZLI-4792 from Merck KGaA.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention and comprising compounds of the formula IA exhibit a considerably smaller drop in the HR with increasing temperature than do analogous mixtures in which the compounds of the formula IA are replaced by cyanophenylcyclohexanes of the formula

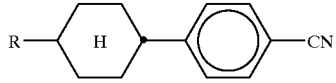

or esters of the formula

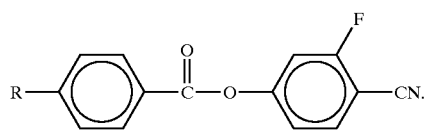

The UV stability of the mixtures according to the invention is also considerably better, i.e. they exhibit a significantly smaller drop in HR on UV exposure.

The formula I preferably covers the following compounds:

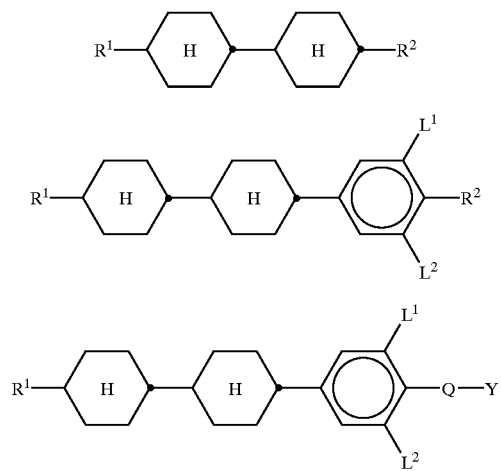

in which $R^1$, $L^1$, $L^2$, Q and Y are as defined in claim 1, and $R^2$ is as defined for R.

Particular preference is given to media according to the invention which comprise at least one compound of the formula I-1 and/or I-3, particularly preferably in each case at least one compound of the formula I-1.

In the formulae I-1, I-2 and I-3, $R^1$ is particularly preferably 1E-alkenyl or 3E-alkenyl having 2 to 7 carbon atoms.

Particularly preferred compounds of the formula I-1 are those in which $R^2$ is alkenyl having 2 to 7 carbon atoms, in particular those of the following formulae:

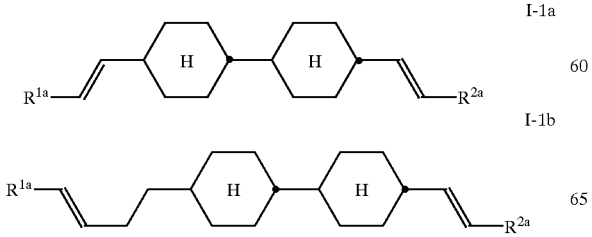

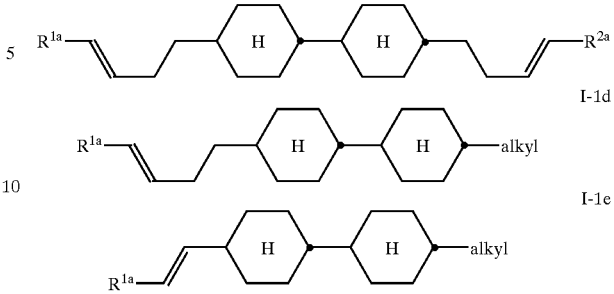

in which $R^{1a}$ and $R^{2a}$ are each, independently of one another, H, $CH_3$, $C_2H_5$ or $n-C_3H_7$, and alkyl is a straight-chain alkyl group having 1 to 7 carbon atoms.

Particular preference is given to media according to the invention which comprise at least one compound of the formulae I-1a and/or I-1c in which $R^{1a}$ and $R^{2a}$ each have the same meaning, and media which comprise at least one compound of the formula I-1e.

In a further preferred embodiment, the media according to the invention comprise one or more compounds of the formula I-2. Particularly preferred compounds of the formula I-2 are those in which $L^1$ and $L^2$ are H, and those in which $R^2$ is alkyl having 1 to 8 carbon atoms, in particular 1, 2 or 3 carbon atoms, and $R^1$ is 1E-alkenyl or 3E-alkenyl having 2 to 7 carbon atoms, in particular 2, 3 or 4 carbon atoms.

Particularly preferred compounds of the formula I-3 are those in which $L^1$ and/or $L^2$ are F and Q—Y is F or $OCF_3$. Further preferred compounds of the formula I-3 are those in which $R^1$ is 1E-alkenyl or 3E-alkenyl having 2 to 7 carbon atoms, in particular 2, 3 or 4 carbon atoms.

Particularly preferred compounds of the formula IA are compounds of the formulae IA-1 to IA-15:

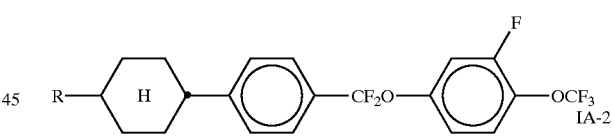

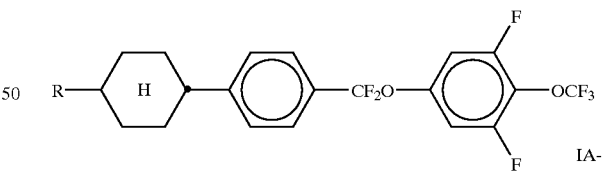

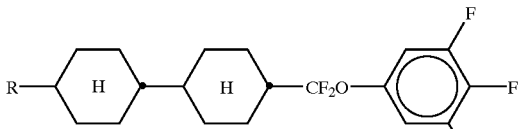

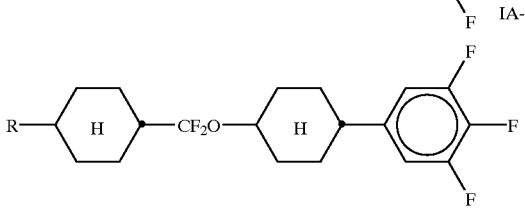

IA-5
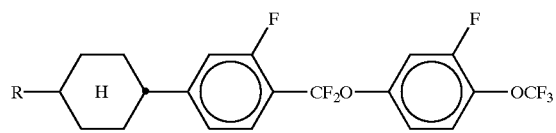

IA-6
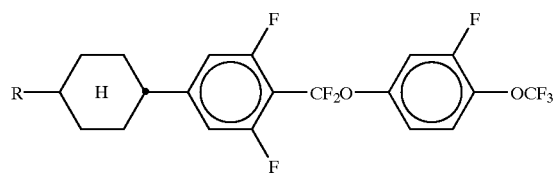

IA-7
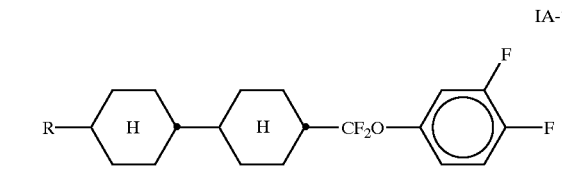

IA-8
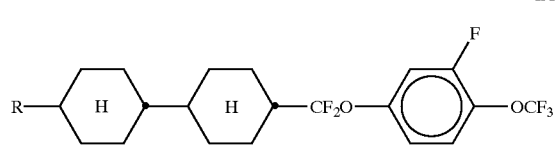

IA-9
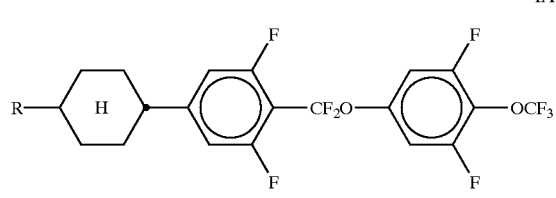

IA-10
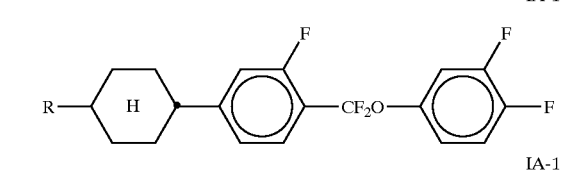

IA-11
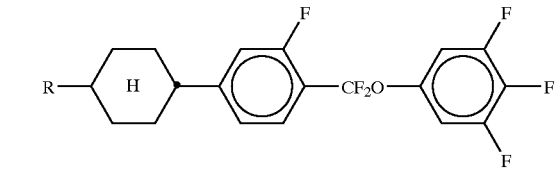

IA-12
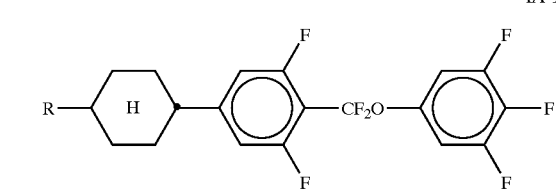

IA-13
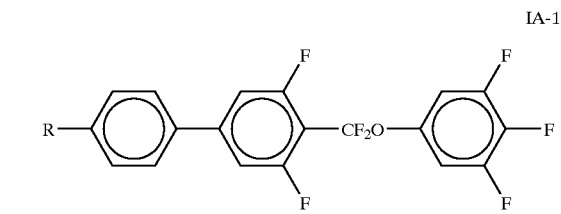

IA-14
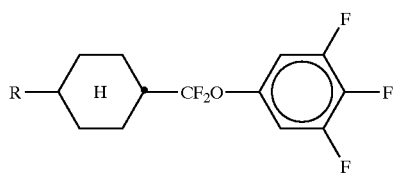

IA-15
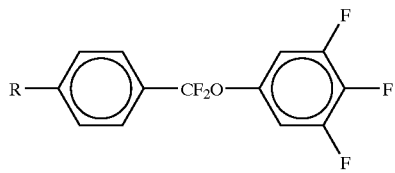

in which R is as defined in the formula IA.

Of these preferred compounds, particular preference is given to those of the formulae IA-1, IA-2, IA-3 and IA-4, in particular of the formulae IA-1 and IA-2.

The compounds of the formula IA are known, for example, from DE-A-40 06 921.

Preferred embodiments are indicated below:

The medium contains one, two or more compounds of the formulae IA-1 to IA-12.

The medium additionally comprises one or more compounds selected from the group consisting of the general formulae II to VI:

II
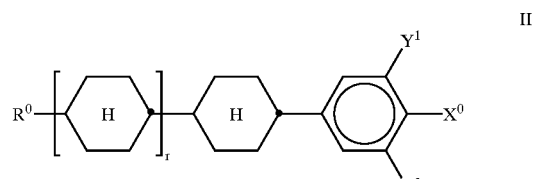

III
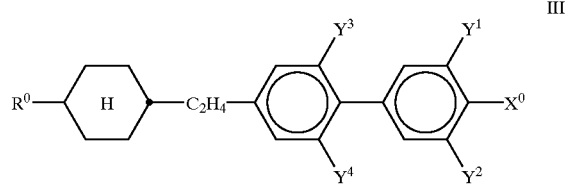

IV
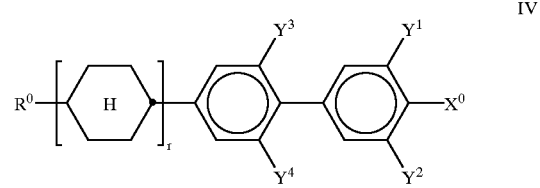

V
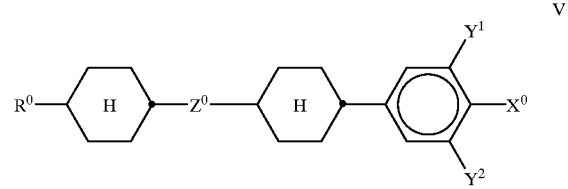

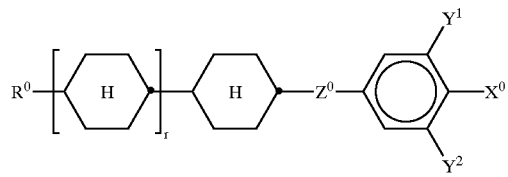

in which the individual radicals have the following meanings:

$R^0$ is n-alkyl, oxaalkyl, fluoroalkyl or alkenyl, in each case having up to 9 carbon atoms, $X^0$ is F, Cl, halogenated alkyl, alkenyl, alkenyloxy or alkoxy having up to 6 carbon atoms, $Z^0$ is —$C_2F_4$—, —$C_2H_4$—, —$(CH_2)_4$—, —$OCH_2$— or —$CH_2O$—, $Y^1$ and $Y^2$ are each, independently of one another, H or F, r is 0 or 1.

The compound of the formula IV is preferably

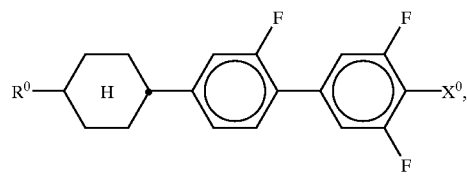

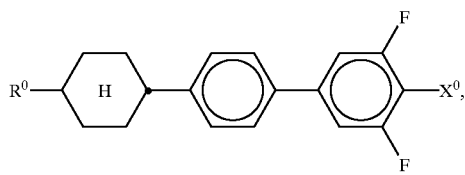

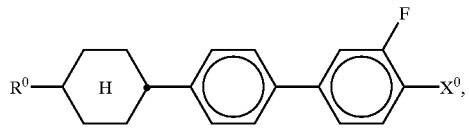

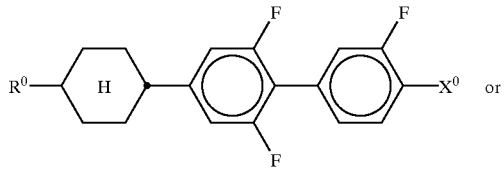

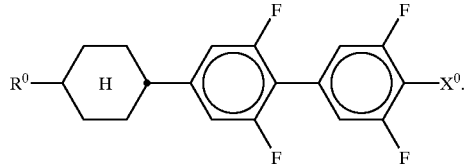

The medium additionally comprises one or more compounds selected from the group consisting of the general formulae VII to XIII:

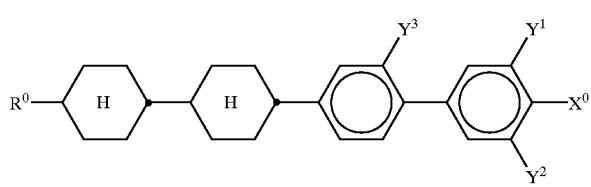

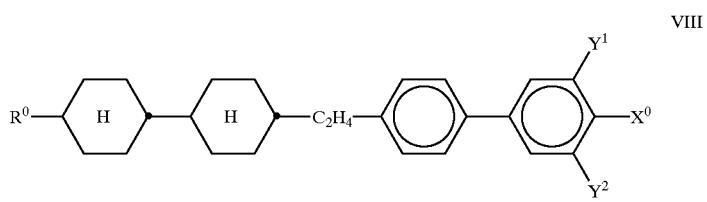

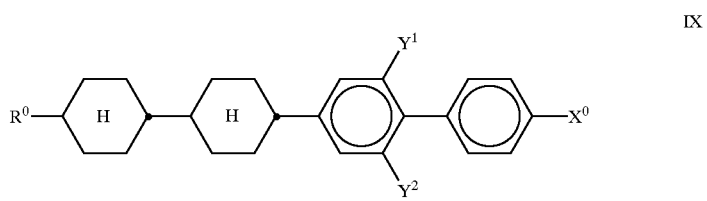

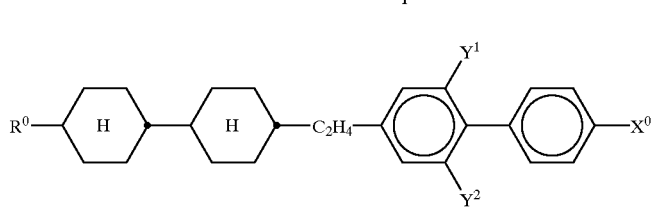

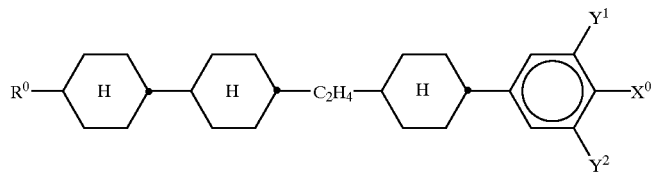

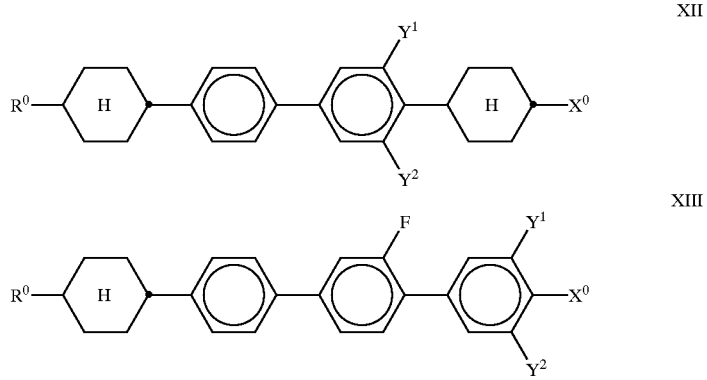

in which $R^0$, $X^0$, $Y^1$ and $Y^2$ are each, independently of one another, as defined in claim 4. $Y^3$ is H or F. $X^0$ is preferably F, Cl, $CF_3$, $OCF_3$, or $OCHF_2$. $R^0$ is preferably alkyl, oxaalkyl, fluoroalkyl or alkenyl, in each case having up to 6 carbon atoms.

The medium additionally comprises one or more ester compounds of the formulae Ea to Ed

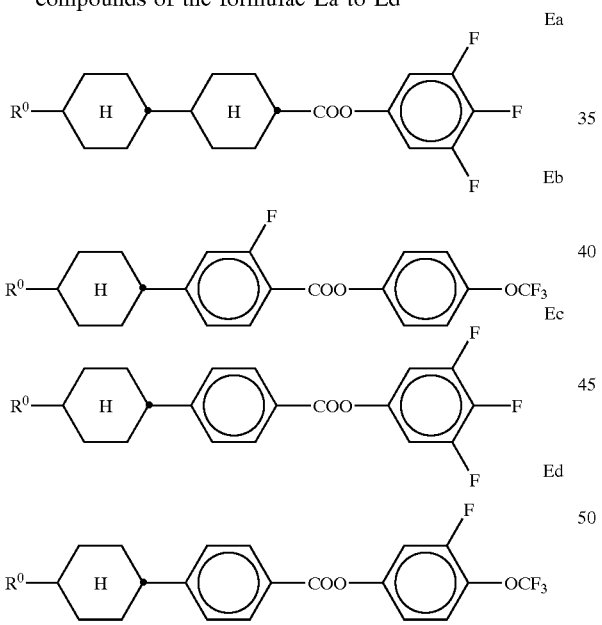

in which $R^0$ is as defined in claim 4;

The proportion of the compound of the formulae Ea to Ed is preferably from 10 to 30% by weight, in particular from 15 to 25% by weight;

The proportion of compounds of the formulae IA and I to VI together in the total mixture is at least 50% by weight;

The proportion of compounds of the formula I in the total mixture is from 0,05 to 40% by weight, particularly preferably from 1 to 30% by weight;

The proportion of compounds of the formula IA in the total mixture is from 1 to 50% by weight, particularly preferably from 15 to 40% by weight;

The proportion of compounds of the formulae II to VI in the total mixture is from 30 to 80% by weight;

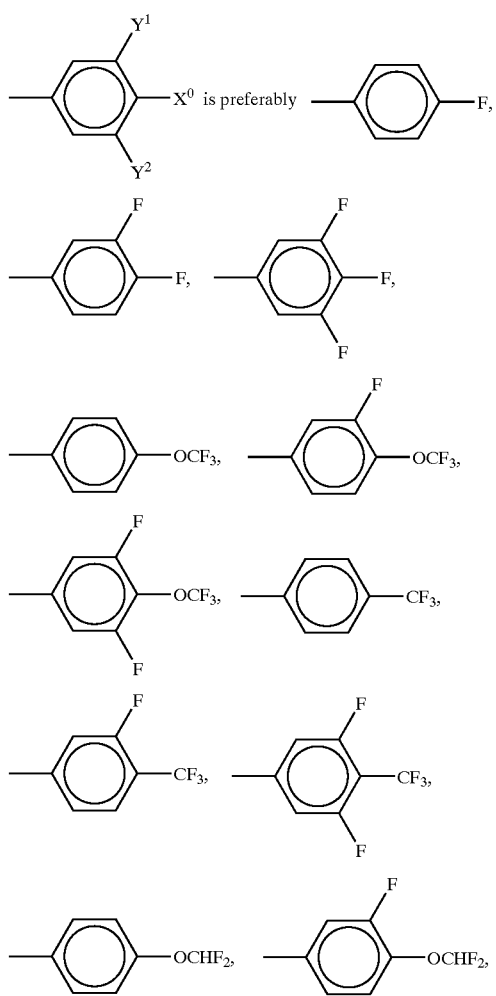

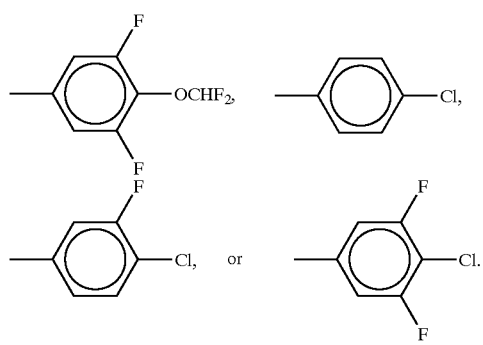

The medium comprises compounds of the formulae II, III, IV, V or VI;

$R^0$ is straight-chain alkyl or alkenyl having 2 to 7 carbon atoms;

The medium essentially consists of compounds of the formulae IA, I to VI and XIII;

The medium comprises further compounds, preferably selected from the following group consisting of the general formulae XIV to XVII:

XIV

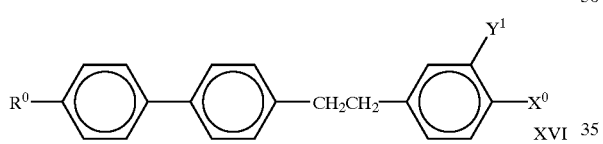
XV

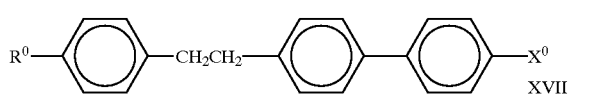
XVI

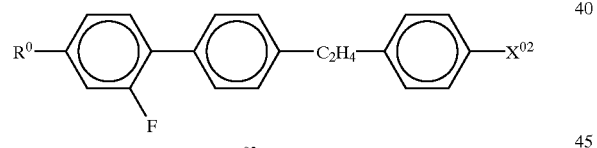
XVII ($X^{02}$ = F or Cl)

in which $R^0$ and $X^0$ are as defined above and the 1,4-phenylene rings can be substituted by CN, chlorine or fluorine. The 1,4-phenylene rings are preferably monosubstituted or polysubstituted by fluorine atoms.

The medium additionally comprises one or more compounds of the formula XVIII

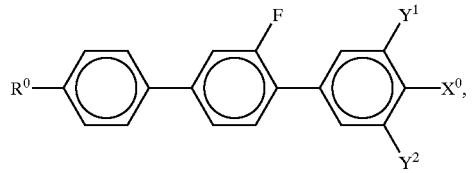
XVIII in which $R^0$, $X^0$, $Y^1$ and $Y^2$ are as defined above.

The medium additionally comprises one, two, three or more, preferably two or three, compounds of the formula

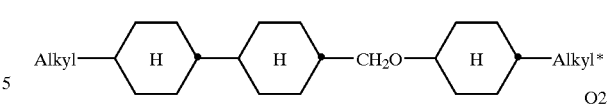
O1
O2 in which "alkyl" and "alkyl*" are as defined below.

The proportion of compounds of the formulae O1 and/or O2 in the mixtures according to the invention is preferably from 5 to 10% by weight.

The medium preferably comprises from 5 to 35% by weight of compound IVa.

The medium preferably comprises one, two or three compounds of the formula IVa, in which $X^0$ is F or $OCF_3$.

The medium preferably comprises one or more compounds of the formulae IIa to IIg

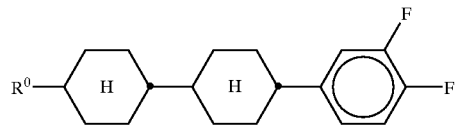
IIa

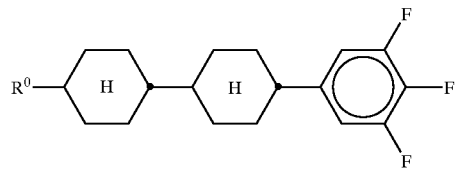
IIb

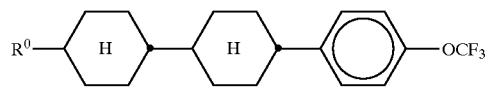
IIc

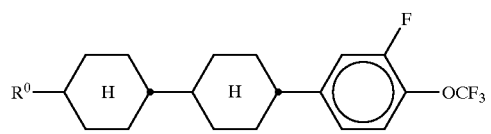
IId

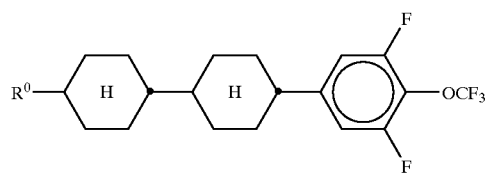
IIe

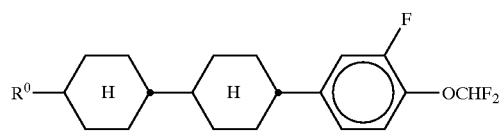
IIf

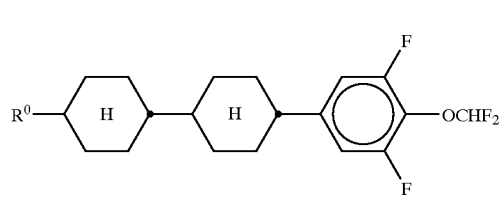
IIg in which $R^0$ is as defined above. In the compounds of the formulae IIa-IIe, $R^0$ is preferably ethyl, n-propyl, n-butyl and n-pentyl.

The weight ratio (I+IA):(II+III +IV+V+VI) is preferably from 1:10 to 10:1.

The medium essentially consists of compounds selected from the group consisting of the general formulae IA and I to XIII.

The proportion of the compounds of the formula IVb and/or IVc, in which $X^0$ is fluorine and $R^0$ is $C_2H_5$, n-$C_3H_7$, n-$C_4H_9$ or n-$C_5H_{11}$, in the total mixture is from 2 to 20% by weight, in particular from 2 to 15% by weight;

The medium additionally comprises one, two or more compounds having fused rings of the formulae AN1 to AN7:

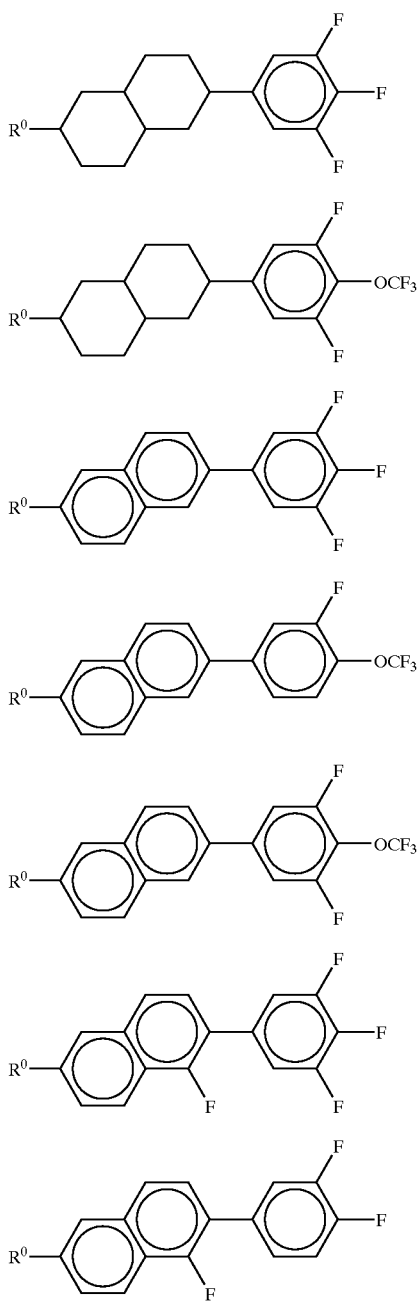

in which $R^0$ is as defined above.

It has been found that even a relatively small proportion of compounds of the formulae I and IA mixed with conventional liquid-crystal materials, but in particular with one or more compounds of the formulae II, III, IV, V and/or VI, leads to a considerable decrease in the threshold voltage and to low birefringence values, where broad nematic phases with low smectic-nematic transition temperatures are simultaneously observed, which improves the storage stability. Particularly preferred are mixtures which, in addition to one or more compounds of the formulae I and IA, comprise one or more compounds of the formula IV, in particular compounds of the formula IVa, in which $X^0$ is F or $OCF_3$. The compounds of the formulae I to VI are colorless, stable and readily miscible with one another and with other liquid-crystalline materials.

The term "alkyl" or "alkyl*" encompasses straight-chain and branched alkyl groups having 1–7 carbon atoms, particularly the straight-chain groups methyl, ethyl, propyl, butyl, pentyl, hexyl and heptyl. Groups having 2–5 carbon atoms are generally preferred.

The term "alkenyl" encompasses straight-chain and branched alkenyl groups having 2–7 carbon atoms, in particular the straight-chain groups. Preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

The term "oxaalkyl" preferably encompasses straight-chain radicals of the formula $C_nH_{2n+1}$—O—$(CH_2)_m$, where n and m are each, independently of one another, from 1 to 6. Preferably, n=1 and m is 1 to 6.

A suitable choice of the meanings of $R^0$ and $X^0$ allows the response times, the threshold voltage, the steepness of the transmission characteristic lines etc. to be modified as desired. For example, 1E-alkenyl radicals, 3E-alkenyl radicals, 2E-alkenyloxy radicals and the like generally result in shorter response times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally result in lower threshold voltages and smaller values of $k_{33}/k_{11}$ compared with alkyl and alkoxy radicals.

A —$CH_2CH_2$— group generally results in higher $k_{33}/k_{11}$ values compared with a single covalent bond. Higher $k_{33}/k_{11}$ values facilitate, for example, flatter transmission characteristic lines in TN cells with a 90° twist (in order to achieve grey shades) and steeper transmission characteristic lines in STN, SBE and OMI cells (higher multiplexability), and vice versa.

The optimum weight ratio of compounds of the formulae I, IA and II+III+IV+V+VI largely depends on the desired properties, on the choice of the components of the formulae I, IA, II, III, IV, V and/or VI, and on the choice of any other components which may be present.

Suitable weight ratios within the range given above can easily be determined from case to case.

The total amount of compounds of the formulae IA and I to XIII in the mixtures according to the invention is not critical. The mixtures can therefore comprise one or more further components in order to optimize various properties.

However, the observed effect on the response times and the threshold voltage is usually greater the higher the total concentration of compounds of the formulae IA and I to XIII.

In a particularly preferred embodiment, the media according to the invention comprise compounds of the formulae II to VI (preferably II, III and/or IV, especially IVa) in which $X^0$ is F, $OCF_3$, $OCHF_2$, F, $OCH=CF_2$, $OCF=CF_2$ or $OCF_2—CF_2H$. A favorable synergistic effect with the compounds of the formulae I and IA results in particularly advantageous properties. Mixtures comprising compounds of the formula IA and of the formula IVa are particularly notable for their low threshold voltages.

The individual compounds of the formulae IA and I to XVII, and their sub-formulae, which can be used in the media according to the invention are either known or can be prepared analogously to known compounds.

The construction of the MLC display according to the invention from polarizers, electrode base plates and surface-treated electrodes corresponds to the conventional construction for displays of this type. The term conventional construction is broadly drawn here and also covers all variations and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation.

The dielectrics may also comprise further additives known to the person skilled in the art and described in the literature. For example, 0–15% of pleochroic dyes or chiral dopants can be added.

C denotes a crystalline phase, S a smectic phase, $S_C$ a smectic C phase, N a nematic phase and I the isotropic phase.

$V_{10}$ denotes the voltage for 10% transmission (viewing direction perpendicular to the plate surface). $t_{on}$ denotes the on time and $t_{off}$ the off time at an operating voltage corresponding to 2.0 times the value of $V_{10}$. $\Delta n$ denotes the optical anisotropy and $n_o$ the refractive index. $\Delta \in$ denotes the dielectric anisotropy ($\Delta \in = \in_\parallel - \in_{195}$, where $\in_\parallel$ refers to the dielectric constant parallel to the longitudinal axes of the molecule and $\in_\perp$ is the dielectric constant perpendicular thereto). The electro-optical data were measured in a TN cell in the 1st minimum (i.e. at a d·$\Delta$n value of 0.5) at 20° C., unless expressly stated otherwise. The optical data were measured at 20° C., unless expressly stated otherwise.

In the present application and in the following examples, the structures of the liquid-crystal compounds are specified by acronyms, which can be transformed into chemical formulae according to the following Tables A and B. All radicals $C_nH_{2n+1}$ and $C_mH_{2m+1}$ are straight-chain alkyl radicals having n or m carbon atoms; n and m are integers and are preferably 0, 1, 2, 3, 4, 5, 6, 7, 8, 9, 10, 11 or 12. The coding according to Table B is self-evident. Table A specifies the acronym for the parent body only. In individual cases, the acronym for the parent body is followed, separated therefrom by a hyphen, by a code for the substituents $R^{1*}$, $R^{2*}$, $L^{1*}$, $L^{2*}$ and $L^{3*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ | $L^{3*}$ |
|---|---|---|---|---|---|
| nm | $C_nH_{2n+1}$ | $C_mH_{2m+1}$ | H | H | H |
| nOm | $OC_nH_{2n+1}$ | $C_mH_{2m+1}$ | H | H | H |
| nO.m | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |
| nmF | $C_nH_{2n+1}$ | $C_mH_{2m+1}$ | F | H | H |
| nOCF$_3$ | $C_nH_{2n+1}$ | OCF$_3$ | H | H | H |
| nOCF$_3$.F | $C_nH_{2n+1}$ | OCF$_3$ | F | H | H |
| n-Vm | $C_nH_{2n+1}$ | —CH=CH—$C_mH_{2m+1}$ | H | H | H |
| nV-VM | $C_nH_{2n+1}$—CH=CH— | —CH=CH—$C_mH_{2m+1}$ | H | H | H |

Preferred mixture components are shown in Tables A and B.

TABLE A

PYP          PYRP

TABLE A-continued
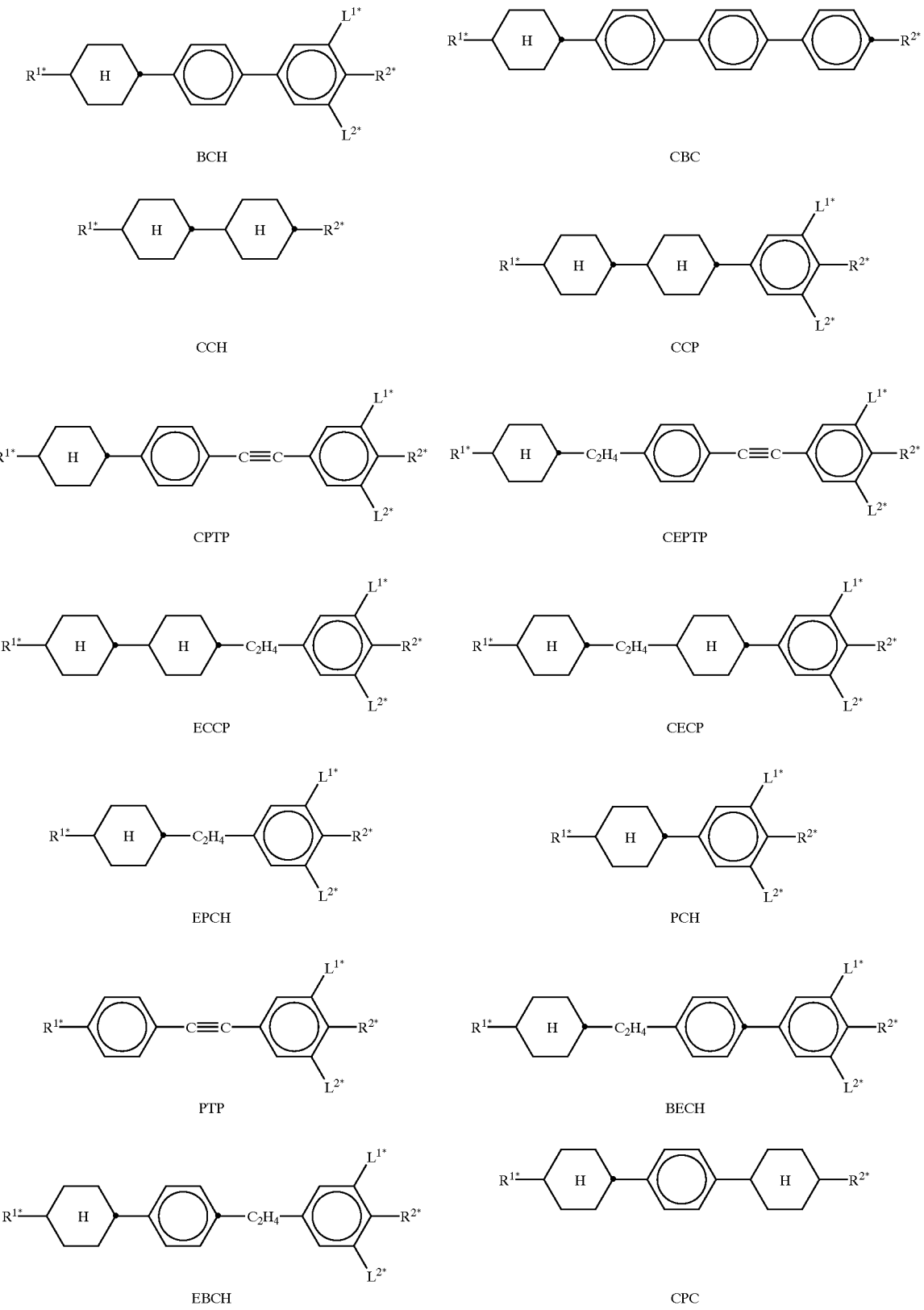

TABLE A-continued
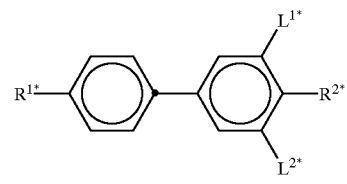
B
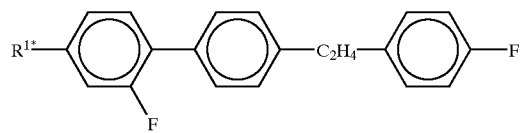
FET-nF
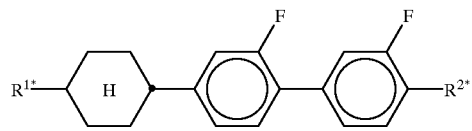
CGG
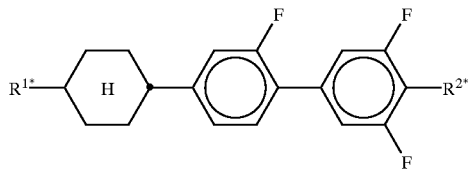
CGU
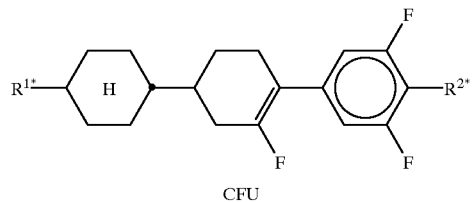
CFU
TABLE B
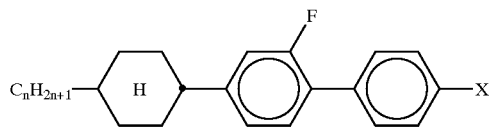
BCH-n.Fm
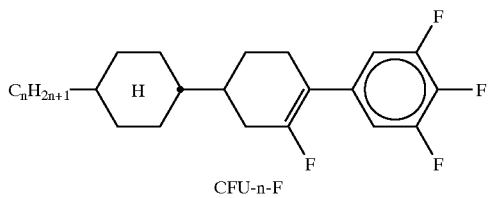
CFU-n-F
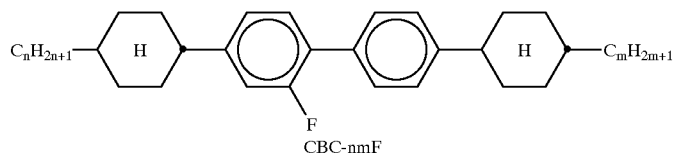
CBC-nmF
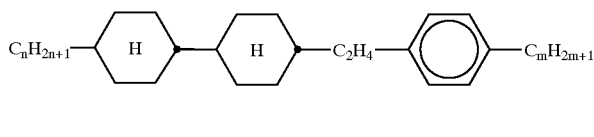
ECCP-nm
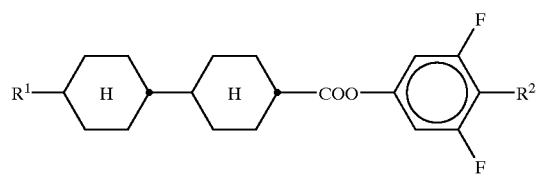
CCZU-n-F
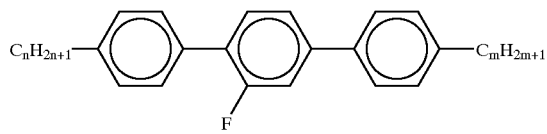
T-nFm
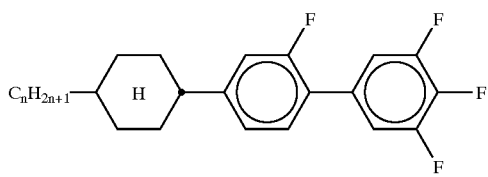
CGU-n-F TABLE B-continued
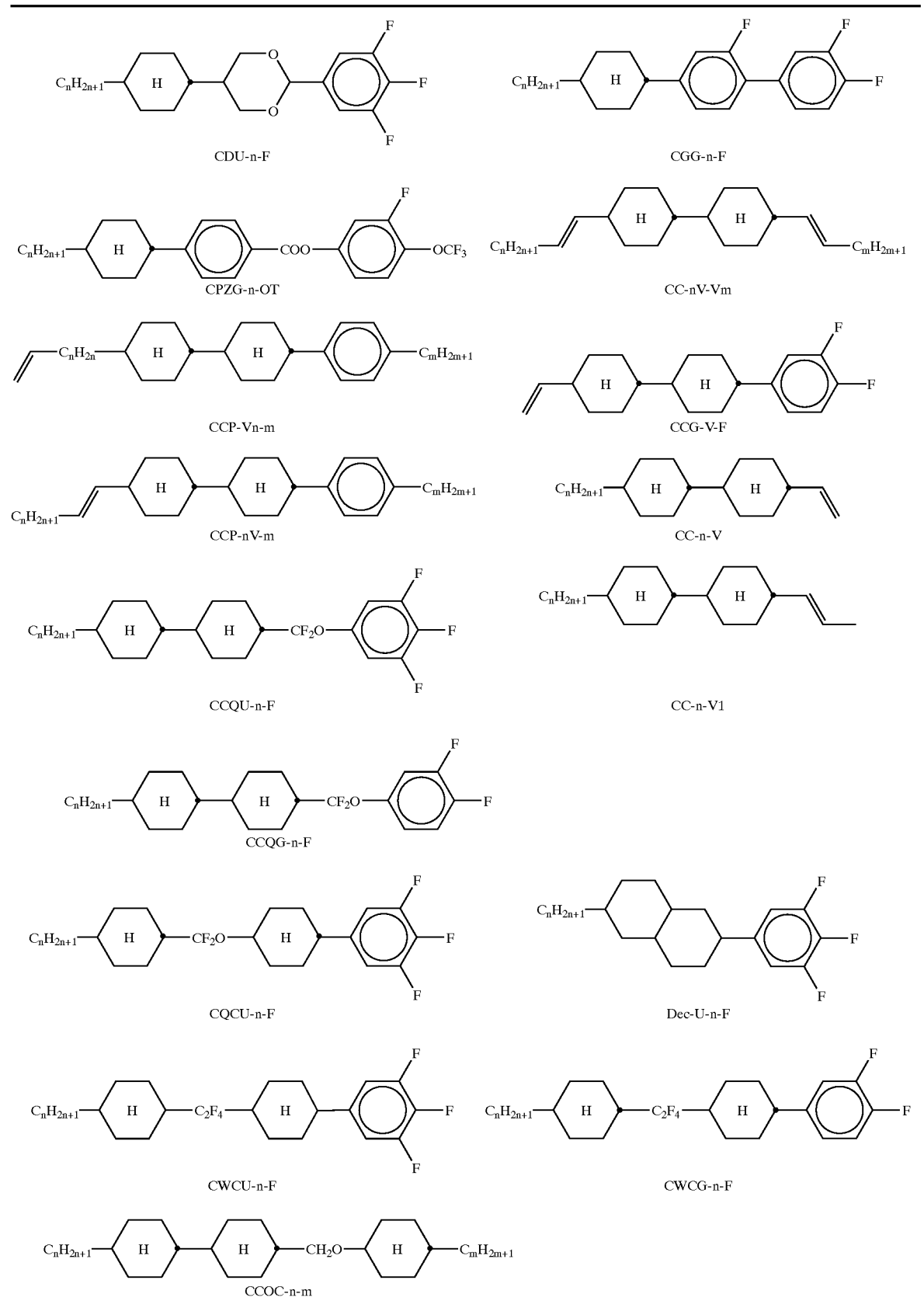

TABLE B-continued
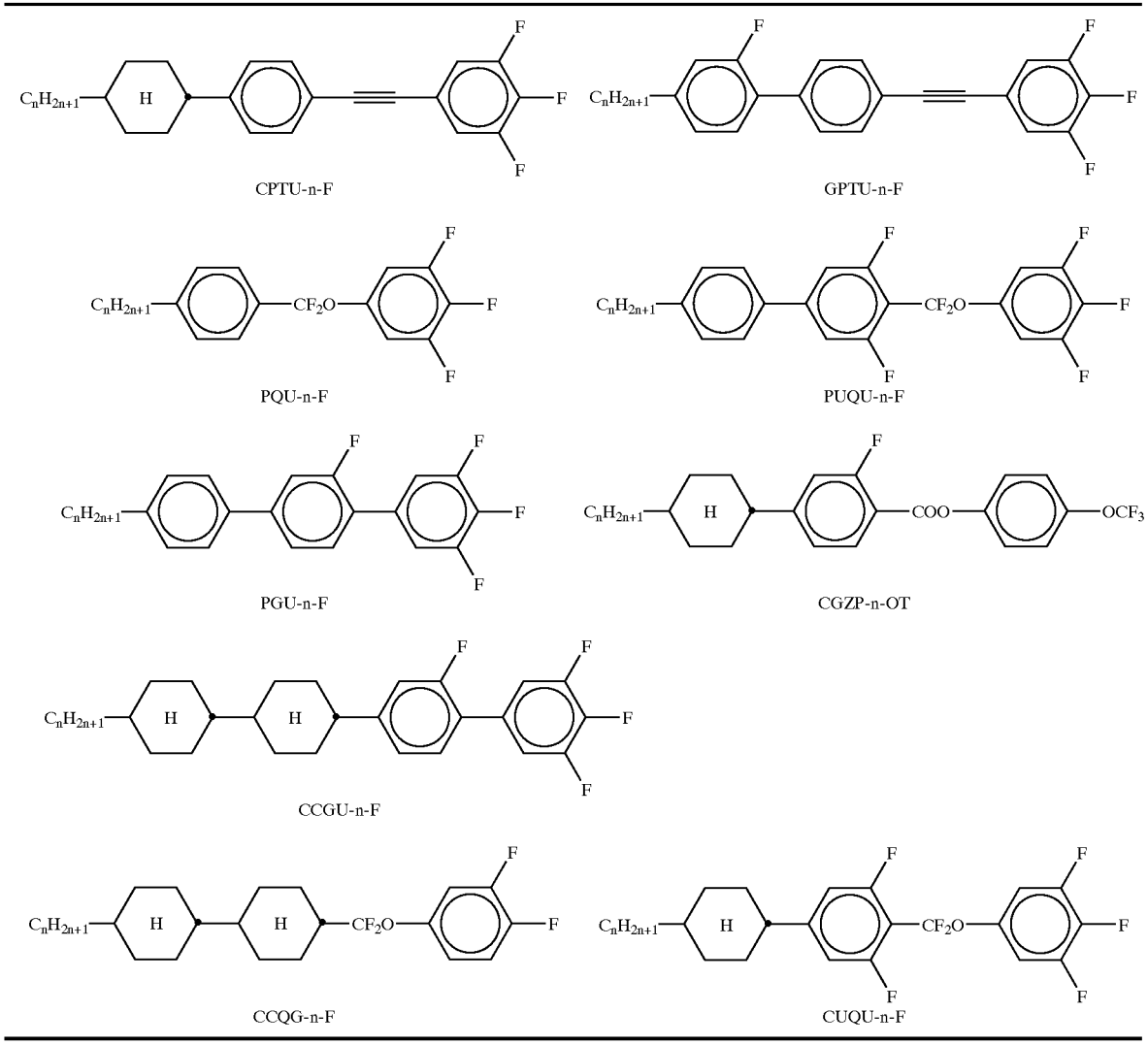
Particular preference is given to liquid-crystalline mixtures which comprise, in addition to the compounds of the formulae I and IA, at least one, two, three or four compounds from Table B.
TABLE C
Table C lists possible dopants which are usually added to the mixtures according to the invention.
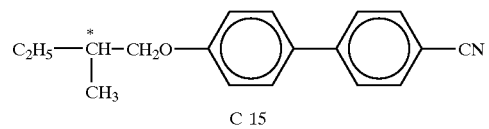
C 15
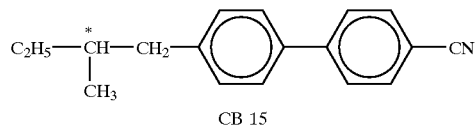
CB 15
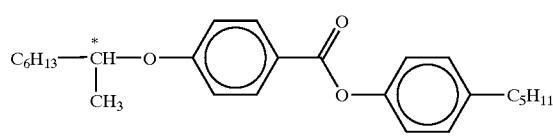
CM 21
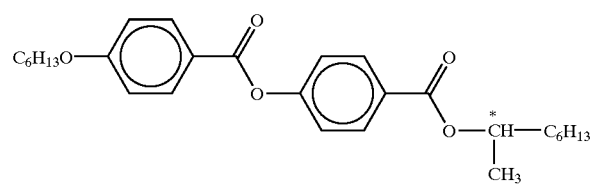
R/S-811

TABLE C-continued

Table C lists possible dopants which are usually added to the mixtures according to the invention.

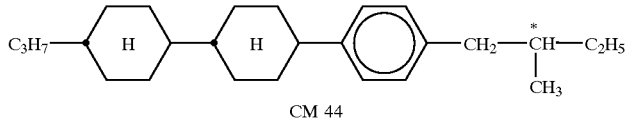
CM 44

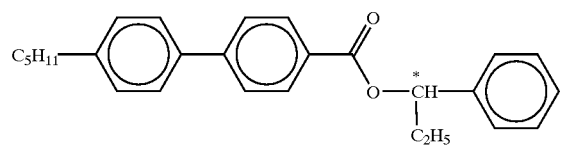
CM 45

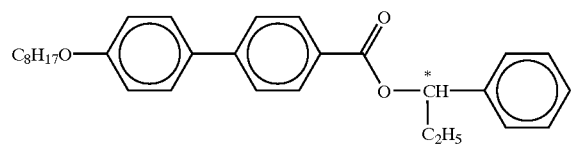
CM 47

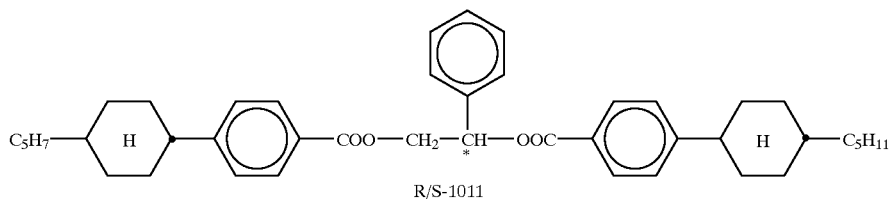
R/S-1011

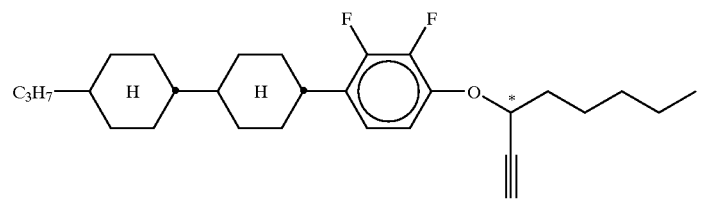
R/S-3011

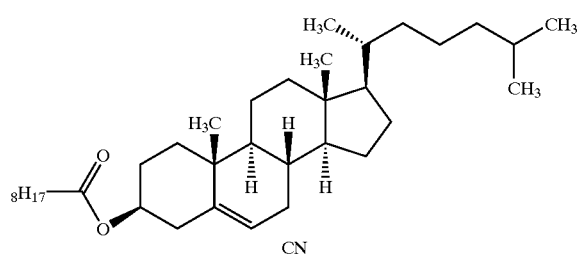
CN

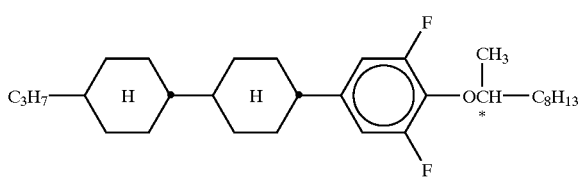
R/S-2011

The following examples are intended to illustrate the invention without limiting it. Hereinbefore and hereinafter, percentages are given in percent by weight. All temperatures are specified in degrees Celsius. m.p. denotes melting point, cl.p. denotes clearing point. Furthermore, C=crystalline state, N=nematic phase, S=smectic phase and I=isotropic phase. The data between these symbols represent the transition temperatures. Δn denotes the optical anisotropy (589 nm, 20° C.). The flow viscosity $v_{20}$ (mm²/s) and the rotational viscosity $\gamma_1$ (mPa·s) were each determined at 20° C.

Example 1

| | | | |
|---|---|---|---|
| CC-5-V | 14.0% | S → N [° C.]: | <−40 |
| CC-3-V1 | 8.0% | Clearing point [° C.]: | +72.5 |
| CCQU-3-F | 22.0% | Δn [589 nm; 20° C.]: | +0.0838 |
| BCH-3F.F.F | 8.0% | Δε [1 kHz; 20° C.]: | 9.8 |
| CGU-2-F | 10.0% | $\gamma_1$ [mPa · s; 20° C.]: | 103 |
| CGU-3-F | 11.0% | d · Δn [μm; 20° C.]: | 0.50 |
| CCZU-2-F | 4.0% | Twist: | 90° |
| CCZU-3-F | 15.0% | $V_{10, 0, 20}$: | 1.23 V |
| CCZU-5-F | 1.0% | | |
| CCG-V-F | 7.0% | | |

Example 2

| | | | |
|---|---|---|---|
| PCH-7F | 4.0% | Clearing point [° C.]: | 95.9 |
| CC-5-V | 12.0% | Δn [589 nm; 20° C.]: | 0.085 |
| CCQU-3-F | 18.0% | Δε [1 kHz; 20° C.]: | 6.9 |
| CCP-3F.F.F | 5.0% | $\gamma_1$ [mPa · s; 20° C.]: | 135 |
| CCP-5F.F.F | 7.0% | d · Δn [μm; 20° C.]: | 0.50 |
| CWCG-3-F | 8.0% | Twist: | 90° |
| CCP-2OCF₃ | 8.0% | | |
| CCP-3OCF₃ | 8.0% | | |
| CCP-4OCF₃ | 6.0% | | |
| CCP-5OCF₃ | 8.0% | | |
| BCH-2F.F | 8.0% | | |
| BCH-3F.F | 8.0% | | |

Example 3

| | | | |
|---|---|---|---|
| CQGU-3-F | 18.0% | Clearing point [° C.]: | 73.8 |
| CCP-5F.F.F | 5.0% | Δn [589 nm; 20° C.]: | 0.087 |

-continued

| | | | | |
|---|---|---|---|---|
| CWCU-3-F | 4.0% | Δε [1 kHz; 20° C.]: | 11.2 | |
| CCG-V-F | 1.0% | γ₁ [mPa·s; 20° C.]: | 155 | |
| CCP-3OCF₃ | 6.0% | d · Δn [μm; 20° C.]: | 0.50 | |
| CCP-5OCH₃ | 2.0% | Twist: | 90° | |
| CGU-2-F | 11.0% | | | |
| CGU-3-F | 11.0% | | | |
| CGU-5-F | 10.0% | | | |
| BCH-3F.F | 4.0% | | | |
| CCZU-2-F | 7.0% | | | |
| CCZU-3-F | 14.0% | | | |
| CCZU-5-F | 7.0% | | | |

Example 4

| | | | |
|---|---|---|---|
| CC-3-V1 | 3.00% | Clearing point [° C.]: | 79.0 |
| CCP-2OCF₃ | 8.00% | Δn [589 nm; 20° C.]: | 0.0849 |
| CCP-3OCF₃ | 8.00% | Δε [1 kHz; 20° C.]: | 9.8 |
| CCP-4OCF₃ | 8.00% | γ₁ [mPa·s; 20° C.]: | 129 |
| CCQU-2-F | 15.00% | | |
| CCQU-3-F | 13.00% | | |
| CCQU-5-F | 8.00% | | |
| CCP-2F.F.F | 10.00% | | |
| BCH-3F.F.F | 9.00% | | |
| CGU-2-F | 10.00% | | |
| CGU-3-F | 6.00% | | |
| CBC-33 | 2.00% | | |

Example 5

| | | | |
|---|---|---|---|
| CC-5-V | 12.00% | Clearing point [° C.]: | 66.7 |
| CC-3-V1 | 10.00% | Δn [589 nm; 20° C.]: | 0.080 |
| CCQU-2-F | 15.00% | Δε [1 kHz; 20° C.]: | 8.5 |
| CCQU-3-F | 12.00% | γ₁ [mPa·s; 20° C.]: | 103 |
| BCH-3F.F.F | 8.00% | | |
| BCH-2F.F.F | 2.00% | | |
| CGU-2-F | 11.00% | | |
| CGU-3-F | 10.00% | | |
| CCZU-2-F | 4.00% | | |
| CCZU-3-F | 12.00% | | |
| BCH-32 | 4.00% | | |

Example 6

| | | | |
|---|---|---|---|
| CCP-2OCF₃ | 2.00% | S → N [° C.]: | <−40.0 |
| CCP-3OCF₃ | 9.00% | Clearing point [° C.]: | +78.5 |
| CCP-2F.F.F | 9.00% | Δn [589 nm, 20° C.]: | +0.1048 |
| CCP-3F.F.F | 3.00% | d · Δn [20° C.]: | 0.50 |
| CGZP-2-OT | 14.00% | Twist [°]: | 90 |
| CGZP-3-OT | 10.00% | V₁₀ [V]: | 0.93 |
| CCZU-2-F | 4.00% | | |
| CCZU-3-F | 15.00% | | |
| CCZU-5-F | 2.00% | | |
| CGU-2-F | 3.00% | | |
| PGU-2-F | 9.00% | | |
| PGU-3-F | 2.00% | | |
| CUQU-2-F | 6.00% | | |
| CUQU-3-F | 6.00% | | |
| CUQU-5-F | 2.00% | | |
| CCP-V-1 | 4.00% | | |

Example 7

| | | | |
|---|---|---|---|
| CCP-2OCF₃ | 8.00% | S → N [° C.]: | <−40.0 |
| CCP-3OCF₃ | 8.00% | Clearing point [° C.]: | +71.5 |
| CGZP-2-OT | 12.00% | Δn [589 nm, 20° C.]: | +0.1047 |
| CGZP-3-OT | 8.00% | γ₁ [20° C., mPa·s]: | 141 |
| CCZU-2-F | 5.00% | d · Δn [20° C.]: | 0.50 |
| CCZU-3-F | 14.00% | Twist [°]: | 90 |
| CUQU-2-F | 6.00% | V₁₀ [V]: | 0.97 |
| CUQU-3-F | 6.00% | | |
| CUQU-5-F | 2.00% | | |
| CGU-2-F | 6.00% | | |
| CGU-3-F | 4.00% | | |
| PGU-2-F | 8.00% | | |
| PGU-3-F | 5.00% | | |
| CC-3-V1 | 3.00% | | |
| CCH-35 | 5.00% | | |

Example 8

| | | | |
|---|---|---|---|
| CC-3-V1 | 3.00% | S → N [° C.]: | <−30.0 |
| CCH-35 | 5.00% | Clearing point [° C.]: | +74.0 |
| CC-5-V | 18.00% | Δn [589 nm, 20° C.]: | +0.0796 |
| CUQU-2-F | 7.00% | γ₁ [20° C., mPa·s]: | 94 |
| CUQU-3-F | 4.00% | d · Δn [20° C.]: | 0.50 |
| CCP-3OCF₃ | 8.00% | Twist [°]: | 90 |
| CCP-4OCF₃ | 7.00% | V₁₀ [V]: | 1.25 |
| CCP-2F.F.F | 6.00% | | |
| CGU-2-F | 9.00% | | |
| CCZU-2-F | 4.00% | | |
| CCZU-3-F | 15.00% | | |
| CGZP-2-OT | 11.00% | | |
| CGZP-3-OT | 3.00% | | |

Example 9

| | | | |
|---|---|---|---|
| CCP-2F.F.F | 10.00% | S → N [° C.]: | <−40.0 |
| CCP-3F.F.F | 10.00% | Clearing point [° C.]: | +80.5 |
| CCP-2OCF₃ | 8.00% | Δn [589 nm, 20° C.]: | +0.0775 |
| CCP-3OCF₃ | 8.00% | γ₁ [20° C., mPa·s]: | 105 |
| CCP-4OCF₃ | 4.00% | d · Δn [20° C.]: | 0.50 |
| CCZU-2-F | 5.00% | Twist [°]: | 90 |
| CCZU-3-F | 14.00% | V₁₀ [V]: | 1.30 |
| CUQU-2-F | 6.00% | | |
| CUQU-3-F | 6.00% | | |
| CC-3-VI | 9.00% | | |
| CUZP-2-OT | 10.00% | | |
| CC-5-V | 10.00% | | |

Example 10

| | | | |
|---|---|---|---|
| CCH-35 | 5.00% | S → N [° C.]: | <−40.0 |
| CC-3-V1 | 3.00% | Clearing point [° C.]: | +71.0 |
| CC-5-V | 18.00% | Δn [589 nm, 20° C.]: | +0.0778 |
| CUQU-2-F | 6.00% | γ₁ [20° C., mPa·s]: | 95 |
| CUQU-3-F | 5.00% | d · Δn [20° C.]: | 0.50 |
| CUQU-5-F | 2.00% | Twist [°]: | 90 |
| CCP-3OCF₃ | 8.00% | V₁₀ [V]: | 1.21 |
| CCP-2F.F.F | 9.00% | | |
| CCP-3F.F.F | 6.00% | | |
| BCH-3F.F.F | 3.00% | | |
| CGU-2-F | 3.50% | | |
| CCZU-2-F | 4.00% | | |
| CCZU-3-F | 14.50% | | |
| CGZP-2-OT | 10.00% | | |
| CGZP-3-OT | 3.00% | | |

Example 11

| | | | |
|---|---|---|---|
| CC-3-V | 18.00% | Clearing point [° C.]: | +79.5 |
| CC-3-V1 | 9.00% | Δn [589 nm, 20° C.]: | +0.1014 |
| CCH-35 | 3.00% | d · Δn [20° C.]: | 0.50 |
| CC-5-V | 2.00% | Twist [°]: | 90 |
| CCP-3OCF₃ | 7.00% | V₁₀ [V]: | 1.58 |
| CCP-2OCF₃ | 6.00% | | |
| PGU-2-F | 7.00% | | |
| PUQU-2-F | 7.00% | | |
| PUQU-3-F | 11.00% | | |
| CGZP-3-OT | 6.00% | | |
| CCG-V-F | 5.00% | | |
| CCP-V-1 | 16.00% | | |
| BCH-32 | 3.00% | | |

Example 12

| | | | |
|---|---|---|---|
| CC-3-V | 18.00% | S → N [° C.]: | <−40.0 |
| CC-3-V1 | 9.00% | Clearing point [° C.]: | +80.0 |
| CCH-35 | 3.00% | Δn [589 nm, 20° C.]: | +0.1020 |
| CC-5-V | 2.00% | γ₁ [20° C., mPa·s]: | 72 |
| PCH-53 | 2.00% | d · Δn [20° C.]: | 0.50 |
| CCP-2OCF₃ | 2.00% | Twist [°]: | 90 |
| CCP-3OCF₃ | 6.00% | V₁₀ [V]: | 1.57 |
| PGU-2-F | 7.00% | | |
| PUQU-2-F | 6.00% | | |
| PUQU-3-F | 11.00% | | |
| CCZU-3-F | 4.00% | | |
| CGZP-3-OT | 8.00% | | |
| CCG-V-F | 5.00% | | |
| CCP-V-1 | 13.00% | | |
| CBC-33 | 2.00% | | |
| BCH-32 | 2.00% | | |

Example 13

| | | | |
|---|---|---|---|
| CC-3-V1 | 10.00% | Clearing point [° C.]: | +79.5 |
| CC-5-V | 8.00% | Δn [589 nm, 20° C.]: | +0.1040 |
| PCH-301 | 4.00% | d · Δn [20° C.]: | 0.50 |
| CCH-35 | 4.00% | Twist [°]: | 90 |

| | | | |
|---|---|---|---|
| CCZU-2-F | 4.00% | $V_{10}$ [V]: | 1.28 |
| CCZU-3-F | 11.00% | | |
| PUQU-2-F | 7.00% | | |
| PUQU-3-F | 10.00% | | |
| PGU-2-F | 7.00% | | |
| CGZP-2-OT | 11.00% | | |
| CGZP-3-OT | 7.00% | | |
| CCP-20CF$_3$ | 8.00% | | |
| CCP-30CF$_3$ | 7.00% | | |
| CBC-33 | 2.00% | | |

Example 14

| | | | |
|---|---|---|---|
| CC-3-V1 | 10.00% | S → N [° C.]: | <−40.0 |
| PCH-53 | 3.00% | Clearing point [° C.]: | +80.0 |
| CC-5-V | 8.50% | Δn [589 nm, 20° C.]: | +0.0846 |
| CCH-35 | 4.00% | γ$_1$ [20° C., mPa · s]: | 85 |
| CCP-2F.F.F | 9.00% | d · Δn [20° C.]: | 0.50 |
| CCP-3F.F.F | 9.00% | Twist [°]: | 90 |
| CCP-20CF$_3$ | 8.00% | $V_{10}$ [V]: | 1.62 |
| CCP-30CF$_3$ | 8.00% | | |
| CCP-50CF$_3$ | 5.00% | | |
| PUQU-2-F | 5.50% | | |
| PUQU-3-F | 9.00% | | |
| CCP-V-1 | 6.00% | | |
| CCG-V-F | 15.00% | | |

Example 15

| | | | |
|---|---|---|---|
| CC-3-V1 | 10.00% | S → N [° C.]: | <−40.0 |
| PCH-53 | 1.00% | Clearing point [° C.]: | +80.5 |
| CC-5-V | 11.00% | Δn [589 nm, 20° C.]: | +0.0808 |
| CCP-20CF$_3$ | 8.00% | γ$_1$ [20° C., mPa · s]: | 81 |
| CCP-30CF$_3$ | 8.00% | d · Δn [20° C.]: | 0.50 |
| CCG-V-F | 17.00% | Twist [°]: | 90 |
| BCH-2F.F | 8.00% | $V_{10}$ [V]: | 1.82 |
| BCH-3F.F | 8.00% | | |
| BCH-3F.F.F | 5.00% | | |
| PUQU-2-F | 6.00% | | |
| PUQU-3-F | 9.00% | | |
| BCH-32 | 5.00% | | |
| CCP-V-1 | 4.00% | | |

Example 16

| | | | |
|---|---|---|---|
| CCH-35 | 4.00% | S → N [° C.]: | <−40.0 |
| CC-5-V | 12.00% | Clearing point [° C.]: | +80.5 |
| PCH-53 | 4.00% | Δn [589 nm, 20° C.]: | +0.0808 |
| CC-3-V1 | 10.00% | γ$_1$ [20° C., mPa · s]: | 81 |
| CCG-V-F | 20.00% | d · Δn [20° C.]: | 0.50 |
| CCP-2F.F.F | 10.00% | Twist [°]: | 90 |
| CCP-3F.F.F | 10.00% | $V_{10}$ [V]: | 1.82 |
| PUQU-3-F | 9.00% | | |
| CCP-20CF$_3$ | 8.00% | | |
| CCP-30CF$_3$ | 5.00% | | |
| CCP-V-1 | 8.00% | | |

Example 17

| | | | |
|---|---|---|---|
| PCH-53 | 4.50% | S → N [° C.]: | <−40.0 |
| CC-3-V1 | 10.00% | Clearing point [° C.]: | +80.0 |
| CC-5-V | 12.00% | Δn [589 nm, 20° C.]: | +0.1040 |
| CCG-V-F | 20.00% | γ$_1$ [20° C., mPa · s]: | 83 |
| BCH-3F.F.F | 11.00% | d · Δn [20° C.]: | 0.50 |
| BCH-2F.F | 8.00% | Twist [°]: | 90 |
| BCH-3F.F | 8.00% | $V_{10}$ [V]: | 1.79 |
| PUQU-3-F | 9.50% | | |
| BCH-32 | 4.00% | | |
| COP-V-1 | 13.00% | | |

Example 18

| | | | |
|---|---|---|---|
| CC-3-V1 | 11.00% | S → N [° C.]: | <−40.0 |
| PCH-53 | 1.00% | Clearing point [° C.]: | +80.0 |
| CC-5-V | 10.00% | Δn [589 nm, 20° C.]: | +0.1038 |
| CCP-20CF$_3$ | 8.00% | γ$_1$ [20° C., mPas · s]: | 85 |
| CCP-30CF$_3$ | 8.00% | d · Δn [20° C.]: | 0.50 |
| CCG-V-F | 17.00% | Twist [°]: | 90 |
| BCH-2F.F | 8.00% | $V_{10}$ [V]: | 1.60 |
| BCH-3F.F | 8.00% | | |
| BCH-3F.F.F | 5.00% | | |
| PUQU-2-F | 6.00% | | |
| PUQU-3-F | 9.00% | | |
| BCH-32 | 5.00% | | |
| CCP-V-1 | 4.00% | | |

Example 19

| | | | |
|---|---|---|---|
| CC-5-V | 8.00% | S → N [° C.]: | <−40.0 |
| CC-3-V1 | 11.00% | Clearing point [° C.]: | +79.0 |
| CCH-35 | 4.00% | Δn [589 nm, 20° C.]: | +0.1046 |
| PUQU-2-F | 6.00% | γ$_1$ [20° C., mPa · s]: | 99 |
| PUQU-3-F | 10.00% | d · Δn [20° C.]: | 0.50 |
| CGU-2-F | 10.00% | Twist [°]: | 90 |
| CGU-3-F | 10.00% | $V_{10}$ [V]: | 1.26 |
| CGZP-2-OT | 11.00% | | |
| CGZP-3-OT | 7.00% | | |
| CCP-30CF$_3$ | 8.00% | | |
| CCP-40CF$_3$ | 8.00% | | |
| CCP-V-1 | 4.00% | | |
| CBC-33 | 3.00% | | |

Example 20

| | | | |
|---|---|---|---|
| CC-3-V1 | 11.00% | S → N [° C.]: | <+79.5 |
| PCH-53 | 2.00% | Clearing point [° C.]: | −40.0 |
| CC-5-V | 8.00% | Δn [589 nm, 20° C.]: | +0.1040 |
| CCP-20CF$_3$ | 8.00% | d · Δn [20° C.]: | 0.50 |
| CCP-30CF$_3$ | 8.00% | Twist [°]: | 90 |
| CCG-V-F | 16.00% | $V_{10}$ [V]: | 1.79 |
| BCH-2F.F | 8.00% | | |
| BCH-3F.F | 8.00% | | |
| BCH-3F.F.F | 8.00% | | |
| PUQU-2-F | 5.00% | | |
| PUQU-3-F | 9.00% | | |
| BCH-32 | 4.00% | | |
| COP-V-1 | 5.00% | | |

Example 21

| | | | |
|---|---|---|---|
| CCH-35 | 4.00% | S → N [° C.]: | <−40.0 |
| CC-5-V | 9.00% | Clearing point [° C.]: | +80.0 |
| PCH-53 | 5.00% | Δn [589 nm, 20° C.]: | +0.0821 |
| CC-3-V1 | 10.00% | d · Δn [20° C.]: | 0.50 |
| CCG-V-F | 20.00% | Twist [°]: | 90 |
| CCP-2F.F.F | 9.00% | $V_{10}$ [V]: | 1.79 |
| CCP-3F.F.F | 9.00% | | |
| BCH-3F.F.F | 4.00% | | |
| PUQU-3-F | 9.00% | | |
| CCP-20CF$_3$ | 8.00% | | |
| CCP-30CF$_3$ | 3.00% | | |
| CCP-V-1 | 10.00% | | |

Example 22

| | | | |
|---|---|---|---|
| CC-3-V | 20.00% | Clearing point [° C.]: | +81.0 |
| CC-3-V1 | 11.00% | Δn [589 nm, 20° C.] | +0.0994 |
| CCP-30CF$_3$ | 8.00% | d · Δn [20° C.]: | 0.50 |
| CCP-20CF$_3$ | 8.00% | Twist [°]: | 90 |
| PGU-2-F | 8.00% | $V_{10}$ [V]: | 1.55 |
| PUQU-3-F | 12.00% | | |
| CGZP-2-OT | 9.00% | | |
| CCZU-2-F | 4.00% | | |
| CCP-2F.F.F | 3.00% | | |
| CCG-V-F | 2.00% | | |
| CCP-V-1 | 11.00% | | |
| BCH-32 | 4.00% | | |

Example 23

| | | | |
|---|---|---|---|
| CC-3-V | 19.00% | S → N [° C.]: | <−40.0 |
| CC-3-V1 | 8.00% | Clearing point [° C.]: | +80.0 |
| CCZU-2-F | 4.00% | Δn [589 nm, 20° C.]: | +0.1008 |
| CCG-V-F | 9.00% | d · Δn [20° C.]: | 0.50 |
| PUQU-2-F | 7.00% | Twist [°]: | 90 |
| PUQU-3-F | 11.00% | $V_{10}$ [V]: | 1.34 |
| PGU-2-F | 4.00% | | |
| CGZP-2-OT | 11.00% | | |
| CGZP-3-OT | 6.00% | | |
| CCP-40CF$_3$ | 8.00% | | |
| CCP-30CF$_3$ | 8.00% | | |
| BCH-32 | 3.00% | | |
| CBC-33 | 2.00% | | |

Example 24

| | | | |
|---|---|---|---|
| CC-3-V | 18.00% | S → N [° C.]: | <−40.0 |
| CC-3-V1 | 9.00% | Clearing point [° C.]: | +80.0 |

-continued

| | | | | |
|---|---|---|---|---|
| CCH-35 | 3.00% | Δn [589 nm, 20° C.]: | | +0.1025 |
| CC-5-V | 2.00% | γ₁ [20° C., mPa · s]: | | 78 |
| PGU-2-F | 8.00% | d · Δn [20° C.]: | | 0.50 |
| PUQU-2-F | 6.00% | Twist [°]: | | 90 |
| PUQU-3-F | 11.00% | V₁₀ [V]: | | 1.37 |
| CCP-20CF₃ | 2.00% | | | |
| CCP-30CF₃ | 6.00% | | | |
| CGZP-2-OT | 8.00% | | | |
| CGZP-3-OT | 7.00% | | | |
| CCZU-3-F | 10.00% | | | |
| CCP-V-1 | 8.00% | | | |
| CBC-33 | 2.00% | | | |

Example 25

| | | | | |
|---|---|---|---|---|
| CC-5-V | 15.00% | Clearing point [° C.]: | | +79.5 |
| CC-3-V1 | 9.00% | Δn [589 nm, 20° C.]: | | +0.1042 |
| CCZU-2-F | 4.00% | d · Δn [20° C.]: | | 0.50 |
| CCZU-3-F | 4.00% | Twist [°]: | | 90 |
| PUQU-3-F | 18.00% | V₁₀ [V]: | | 1.30 |
| PGU-2-F | 6.00% | | | |
| CGZP-2-OT | 11.00% | | | |
| CGZP-3-OT | 9.00% | | | |
| CCP-20CF₃ | 8.00% | | | |
| CCP-30CF₃ | 8.00% | | | |
| CCG-V-F | 4.00% | | | |
| BCH-32 | 2.00% | | | |
| CC-V-1 | 2.00% | | | |

Example 26

| | | | | |
|---|---|---|---|---|
| CC-3-V | 18.00% | S → N [° C.]: | | <−40.0 |
| CC-3-V1 | 6.00% | Clearing point [° C.]: | | +79.0 |
| CCZU-2-F | 4.00% | Δn [589 nm, 20° C.]: | | +0.1046 |
| CCZU-3-F | 8.00% | γ₁ [20° C., mPa · s]: | | 88 |
| PUQU-2-F | 7.00% | d · Δn [20° C.]: | | 0.50 |
| PUQU-3-F | 11.00% | Twist [°]: | | 90 |
| PGU-2-F | 6.00% | V₁₀ [V]: | | 1.25 |
| CGZP-2-OT | 11.00% | | | |
| CGZP-3-OT | 9.00% | | | |
| CCP-20CF₃ | 8.00% | | | |
| CCP-30CF₃ | 8.00% | | | |
| BCH-32 | 2.00% | | | |
| CBC-33 | 2.00% | | | |

Example 27

| | | | | |
|---|---|---|---|---|
| CC-5-V | 8.00% | Clearing point [° C.]: | | +81.5 |
| CC-3-V1 | 8.00% | Δn [589 nm, 20° C.]: | | +0.1052 |
| CC-3-2V | 8.00% | d · Δn [20° C.]: | | 0.50 |
| CCH-35 | 4.00% | Twist [°]: | | 90 |
| CCZU-2-F | 4.00% | V₁₀ [V]: | | 1.35 |
| CCZU-3-F | 5.00% | | | |
| PUQU-2-F | 7.00% | | | |
| PUQU-3-F | 11.00% | | | |
| PGU-2-F | 7.00% | | | |
| CGZP-2-OT | 11.00% | | | |
| CGZP-3-OT | 9.00% | | | |
| CCP-20CF₃ | 8.00% | | | |
| CCP-30CF₃ | 8.00% | | | |
| CBC-33 | 2.00% | | | |

Example 28

| | | | | |
|---|---|---|---|---|
| CCH-301 | 12.00% | | | |
| CC-3-V1 | 11.00% | | | |
| CCH-35 | 5.00% | | | |
| CCZU-2-F | 4.00% | | | |
| CCZU-3-F | 5.00% | | | |
| PUQU-2-F | 7.00% | | | |
| PUQU-3-F | 11.00% | | | |
| PGU-2-F | 7.00% | | | |
| CGZP-2-OT | 11.00% | | | |
| CGZP-3-OT | 9.00% | | | |
| CCP-20CF₃ | 8.00% | | | |
| CCP-30CF₃ | 8.00% | | | |
| CBC-33 | 2.00% | | | |

Example 29

| | |
|---|---|
| CC-5-V | 10.00% |
| PCH-301 | 4.00% |
| CC-3-V1 | 10.00% |
| CCH-35 | 4.00% |

-continued

| | | | | |
|---|---|---|---|---|
| CCZU-2-F | 4.00% | | | |
| CCZU-3-F | 5.00% | | | |
| PUQU-2-F | 7.00% | | | |
| PUQU-3-F | 11.00% | | | |
| PGU-2-F | 7.00% | | | |
| CGZP-2-OT | 11.00% | | | |
| CGZP-3-OT | 9.00% | | | |
| CCP-40CF₃ | 8.00% | | | |
| CCP-30CF₃ | 8.00% | | | |
| CBC-33 | 2.00% | | | |

Example 30

| | | | | |
|---|---|---|---|---|
| CC-3-V1 | 10.00% | Clearing point [° C.]: | | +80.5 |
| CC-3-2V | 10.00% | Δn [589 nm, 20° C.]: | | +0.1060 |
| CCH-301 | 3.00% | d · Δn [20° C.]: | | 0.50 |
| CCH-35 | 4.00% | Twist [°]: | | 90 |
| CCZU-2-F | 4.00% | V₁₀ [V]: | | 1.27 |
| CCZU-3-F | 10.00% | | | |
| PUQU-2-F | 7.00% | | | |
| PUQU-3-F | 11.00% | | | |
| PGU-2-F | 8.00% | | | |
| CGZP-2-OT | 11.00% | | | |
| CGZP-3-OT | 9.00% | | | |
| CCP-20CF₃ | 3.00% | | | |
| CCP-30CF₃ | 8.00% | | | |
| CBC-33 | 2.00% | | | |

Example 31

| | | | | |
|---|---|---|---|---|
| CC-5-V | 16.00% | Clearing point [° C.]: | | +85.5 |
| CC-3-V1 | 10.00% | Δn [589 nm, 20° C.]: | | +0.1052 |
| CCH-3CF₃ | 2.00% | d · Δn [20° C.]: | | 0.50 |
| CCH-35 | 5.00% | Twist [°]: | | 90 |
| CCZU-2-F | 5.00% | V₁₀ [V]: | | 1.46 |
| PUQU-2-F | 8.00% | | | |
| PUQU-3-F | 11.00% | | | |
| PGU-2-F | 5.00% | | | |
| CGZP-2-OT | 10.00% | | | |
| CGZP-3-OT | 7.00% | | | |
| CCP-30CF₃ | 8.00% | | | |
| CCP-V-1 | 9.00% | | | |
| CBC-33 | 3.00% | | | |
| CBC-53 | 1.00% | | | |

Example 32

| | | | | |
|---|---|---|---|---|
| CC-5-V | 16.00% | Clearing point [° C.]: | | +78.5 |
| CC-3-V1 | 9.00% | Δn [589 nm, 20° C.]: | | +0.1027 |
| CCH-3CF₃ | 2.00% | d · Δn [20° C.]: | | 0.50 |
| CCH-35 | 5.00% | Twist [°]: | | 90 |
| CCZU-2-F | 4.00% | V₁₀ [V]: | | 1.44 |
| PUQU-2-F | 8.00% | | | |
| PUQU-3-F | 11.00% | | | |
| PGU-2-F | 6.00% | | | |
| CGZP-2-OT | 10.00% | | | |
| CGZP-3-OT | 8.00% | | | |
| CCP-30CF₃ | 8.00% | | | |
| CCP-V-1 | 13.00% | | | |

Example 33

| | | | | |
|---|---|---|---|---|
| CC-5-V | 13.00% | Clearing point [° C.]: | | +80.0 |
| CC-3-V1 | 9.00% | Δn [589 nm, 20° C.]: | | +0.1060 |
| CCH-35 | 5.00% | d · Δn [20° C.]: | | 0.50 |
| CCZU-2-F | 5.00% | Twist [°]: | | 90 |
| PUQU-2-F | 7.00% | V₁₀ [V]: | | 1.42 |
| PUQU-3-F | 13.00% | | | |
| PGU-2-F | 7.00% | | | |
| CGZP-2-OT | 10.00% | | | |
| CGZP-3-OT | 7.00% | | | |
| CCP-30CF₃ | 8.00% | | | |
| CCP-20CF₃ | 4.00% | | | |
| CCP-V-1 | 12.00% | | | |

Example 34

| | |
|---|---|
| CC-5-V | 18.00% |
| CC-3-V1 | 10.00% |
| CCH-3CF₃ | 0.00% |
| CCH-35 | 5.00% |
| CCP-30CF₃ | 8.00% |
| PGU-2-F | 2.00% |
| PGU-3-F | 0.00% |

| | | | |
|---|---|---|---|
| CGU-2-F | 0.00% | | |
| CGZP-2-OT | 12.00% | | |
| CGZP-3-OT | 7.50% | | |
| CCZU-2-F | 0.00% | | |
| CCZU-3-F | 2.00% | | |
| BCH-32 | 4.00% | | |
| PUQU-2-F | 10.00% | | |
| PUQU-3-F | 12.00% | | |
| CCP-V-1 | 9.50% | | |
| | | Example 35 | |
| CC-5-V | 13.00% | Clearing point [° C.]: | +81.0 |
| CC-3-V1 | 9.00% | Δn [589 nm, 20° C.]: | +0.1043 |
| CCH-35 | 5.00% | d · Δn [20° C., mPa · s]: | 0.50 |
| CCZU-2-F | 5.00% | Twist [°]: | 90 |
| PUQU-2-F | 7.00% | $V_{10}$ [V]: | 1.38 |
| PUQU-3-F | 13.00% | | |
| PGU-2-F | 5.00% | | |
| CGU-2-F | 1.00% | | |
| CGZP-2-OT | 11.00% | | |
| CGZP-3-OT | 7.00% | | |
| CCP-30CF$_3$ | 8.00% | | |
| CCP-20CF$_3$ | 7.00% | | |
| CCP-V-1 | 8.00% | | |
| CBC-33 | 1.00% | | |
| | | Example 36 | |
| CC-5-V | 12.00% | Clearing point [° C.]: | +79.0 |
| CC-3-V1 | 9.00% | Δn [589 nm, 20° C.]: | +0.1037 |
| CCH-35 | 3.00% | d · Δn [20° C.]: | 0.50 |
| CCZU-2-F | 5.00% | Twist [°]: | 90 |
| PUQU-2-F | 7.00% | $V_{10}$ [V]: | 1.33 |
| PUQU-3-F | 13.00% | | |
| PGU-2-F | 6.00% | | |
| CGZP-2-OT | 11.00% | | |
| CGZP-3-OT | 7.00% | | |
| CCP-20CF$_3$ | 8.00% | | |
| CCP-30CF$_3$ | 7.00% | | |
| CCP-40CF$_3$ | 4.00% | | |
| CCG-V-F | 2.00% | | |
| CCP-V-1 | 6.00% | | |
| | | Example 37 | |
| CCP-2F.F.F | 12.00% | Clearing point [° C.]: | +80.0 |
| CCP-3F.F.F | 11.00% | Δn [589 nm, 20° C.]: | +0.0807 |
| CCP-5F.F.F | 6.00% | d · Δn [20° C.]: | 0.50 |
| CCZU-2-F | 5.00% | Twist [°]: | 90 |
| CCZU-3-F | 15.00% | $V_{10}$ [V]: | 1.19 |
| CCZU-5-F | 4.00% | | |
| CCP-20CF$_3$ | 5.00% | | |
| CCP-30CF$_3$ | 3.00% | | |
| CCOC-3-3 | 3.00% | | |
| CCOC-4-3 | 4.00% | | |
| CCOC-3-5 | 3.00% | | |
| CC-5-V | 11.00% | | |
| PUQU-3-F | 8.00% | | |
| PUQU-2-F | 10.00% | | |
| | | Example 38 | |
| CCH-35 | 5.00% | S → N [° C.]: | <−40.0 |
| CC-5-V | 15.50% | Clearing point [° C.]: | +71.0 |
| CCH-3CF$_3$ | 3.50% | Δn [589 nm, 20° C.]: | +0.0768 |
| CCP-20CF$_3$ | 6.00% | $\gamma_1$ [20° C., mPa · s]: | 94 |
| CCP-40CF$_3$ | 8.00% | d · Δn [20° C.]: | 0.50 |
| CCP-20CF$_3$.F | 5.00% | Twist [°]: | 90 |
| CCP-2F.F.F | 10.00% | $V_{10}$ [V]: | 1.21 |
| CCP-3F.F.F | 10.00% | | |
| CCZU-2-F | 4.00% | | |
| CCZU-3-F | 15.00% | | |
| CCZU-5-F | 3.00% | | |
| PUQU-2-F | 9.00% | | |
| PUQU-3-F | 6.00% | | |
| | | Example 39 | |
| CCH-35 | 4.00% | S → N [° C.]: | <−20.0 |
| CCP-30CF$_3$ | 8.00% | Clearing point [° C.]: | +81.5 |
| CCP-40CF$_3$ | 8.00% | Δn [589 nm, 20° C.]: | +0.1034 |
| CCP-2F.F.F | 10.00% | $\gamma_1$ [20° C., mPa · s]: | 161 |
| CGZP-2-OT | 14.00% | d · Δn [20° C.]: | 0.50 |
| CGZP-3-OT | 10.00% | Twist [°]: | 90 |
| CCZU-2-F | 4.00% | $V_{10}$ [V]: | 0.94 |
| CCZU-3-F | 15.00% | | |
| CCZU-5-F | 3.00% | | |
| PGU-2-F | 2.00% | | |
| PUQU-2-F | 11.00% | | |
| PUQU-3-F | 11.00% | | |
| | | Example 40 | |
| CCP-2F.F.F | 9.00% | S → N [° C.]: | <−40.0 |
| CCP-20CF$_3$ | 8.00% | Clearing point [° C.]: | +71.5 |
| CCP-30CF$_3$ | 5.00% | Δn [589 nm, 20° C.]: | +0.1044 |
| CCP-40CF$_3$ | 4.00% | $\gamma_1$ [20° C., mPa · s]: | 151 |
| CCQU-2-F | 10.00% | d · Δn [20° C.]: | 0.50 |
| CCQU-3-F | 12.00% | Twist [°]: | 90 |
| CCQU-5-F | 8.00% | $V_{10}$ [V]: | 0.92 |
| PUQU-2-F | 12.00% | | |
| PUQU-3-F | 12.00% | | |
| PGU-2-F | 9.00% | | |
| PGU-3-F | 2.00% | | |
| CCGU-3-F | 5.00% | | |
| CBC-33 | 1.00% | | |
| CCOC-3-3 | 3.00% | | |
| | | Example 41 | |
| CCH-35 | 5.00% | | |
| CC-5-V | 16.00% | | |
| CCH-3CF$_3$ | 5.00% | | |
| CCP-20CF$_3$ | 6.00% | | |
| CCP-40CF$_3$ | 8.00% | | |
| CCP-20CF$_3$.F | 3.00% | | |
| CCP-2F.F.F | 10.00% | | |
| CCP-3F.F.F | 10.00% | | |
| CCZU-2-F | 3.50% | | |
| CCZU-3-F | 15.00% | | |
| CCZU-5-F | 2.50% | | |
| PUQU-2-F | 8.00% | | |
| PUQU-3-F | 7.00% | | |
| CCOC-3-3 | 1.00% | | |
| | | Example 42 | |
| CCH-35 | 4.50% | S → N [° C.]: | <−40.0 |
| CCP-30CF$_3$ | 8.00% | Clearing point [° C.]: | +80.0 |
| CCP-40CF$_3$ | 5.00% | Δn [589 nm, 20° C.]: | +0.1025 |
| CCP-50CF$_3$ | 2.00% | d · Δn [20° C.]: | 0.50 |
| CCP-2F.F.F | 9.50% | Twist [°]: | 90 |
| CCP-3F.F.F | 2.00% | $V_{10}$ [V]: | 0.94 |
| CGZP-2-OT | 14.00% | | |
| CGZP-3-OT | 10.00% | | |
| CCZU-2-F | 3.50% | | |
| CCZU-3-F | 15.00% | | |
| CCZU-5-F | 2.50% | | |
| PGU-2-F | 2.00% | | |
| PUQU-2-F | 8.00% | | |
| PUQU-3-F | 14.00% | | |
| | | Example 43 | |
| CC-3-V1 | 4.00% | | |
| CCH-35 | 5.00% | | |
| CC-5-V | 17.00% | | |
| CCH-3CF$_3$ | 2.00% | | |
| CCP-20CF$_3$ | 8.00% | | |
| CCP-30CF$_3$ | 6.50% | | |
| CCP-2F.F.F | 10.00% | | |
| CCP-3F.F.F | 9.00% | | |
| CGZP-2-OT | 4.50% | | |
| CCZU-2-F | 4.00% | | |
| CCZU-3-F | 14.00% | | |
| PUQU-3-F | 8.00% | | |
| | | Example 44 | |
| CC-3-V1 | 4.00% | S → N [° C.]: | <−40.0 |
| CCH-35 | 5.00% | Clearing point [° C.]: | +71.0 |
| CC-5-V | 17.00% | Δn [589 nm, 20° C.]: | +0.0797 |
| CCH-3CF$_3$ | 2.00% | d · Δn [20° C.]: | 0.50 |
| CCP-20CF$_3$ | 8.00% | Twist [°]: | 90 |
| CCP-30CF$_3$ | 6.50% | $V_{10}$ [V]: | 1.28 |
| CCP-2F.F.F | 10.00% | | |
| CCP-3F.F.F | 9.00% | | |

-continued

| | | | |
|---|---|---|---|
| CGZP-2-OT | 4.50% | | |
| CCZU-2-F | 4.00% | | |
| CCZU-3-F | 14.00% | | |
| PUQU-3-F | 8.50% | | |
| PUQU-3-F | 7.50% | | |

Example 45

| | | | |
|---|---|---|---|
| CCP-2F.F.F | 12.00% | Clearing point [° C.]: | +82.0 |
| CCP-3F.F.F | 10.00% | $\Delta n$ [589 nm, 20° C.]: | +0.0800 |
| CCP-5F.F.F | 6.00% | d · $\Delta n$ [20° C.]: | 0.50 |
| CCZU-2-F | 5.00% | Twist [°]: | 90 |
| CCZU-3-F | 15.00% | $V_{10}$ [V]: | 1.26 |
| CCZU-5-F | 4.00% | | |
| CCP-20CF$_3$ | 3.00% | | |
| CCP-30CF$_3$ | 2.00% | | |
| CCP-50CF$_3$ | 3.00% | | |
| CCOC-3-3 | 3.00% | | |
| CCOC-4-3 | 4.00% | | |
| CCOC-3-5 | 3.00% | | |
| CC-5-V | 13.00% | | |
| PUQU-3-F | 17.00% | | |

Example 46

| | | | |
|---|---|---|---|
| CCP-2F.F.F | 9.00% | S → N [° C.]: | <−40.0 |
| CCP-20CF$_3$ | 8.00% | Clearing point [° C.]: | +74.5 |
| CCP-30CF$_3$ | 4.50% | $\Delta n$ [589 nm, 20° C.]: | +0.1056 |
| CCP-40CF$_3$ | 4.00% | $\gamma_1$ [20° C., mPa · s]: | 152 |
| CCQU-2-F | 10.00% | d · $\Delta n$ [20° C.]: | 0.50 |
| CCQU-3-F | 12.00% | Twist [°]: | 90 |
| CCQU-5-F | 8.00% | $V_{10}$ [V]: | 0.91 |
| PUQU-2-F | 12.00% | | |
| PUQU-3-F | 12.00% | | |
| PGU-2-F | 9.00% | | |
| PGU-3-F | 1.50% | | |
| CCGU-3-F | 5.00% | | |
| CBC-33 | 2.00% | | |
| CCOC-3-3 | 3.00% | | |

Example 47

| | | | |
|---|---|---|---|
| CCP-2F.F.F | 10.00% | S → N [° C.]: | <−40.0 |
| CCP-20CF$_3$ | 8.00% | Clearing point [° C.]: | +69.0 |
| CCP-30CF$_3$ | 8.00% | $\Delta n$ [589 nm, 20° C.]: | +0.1044 |
| CCP-40CF$_3$ | 4.00% | d · $\Delta n$ [20° C.]: | 0.50 |
| CGZP-2-OT | 12.00% | Twist [°]: | 90 |
| CCZU-2-F | 4.00% | $V_{10}$ [V]: | 0.94 |
| CCZU-3-F | 14.00% | | |
| PUQU-2-F | 12.00% | | |
| PUQU-3-F | 12.00% | | |
| PGU-2-F | 8.00% | | |
| CC-3-V1 | 6.00% | | |
| CCP-V-1 | 2.00% | | |

Example 48

| | | | |
|---|---|---|---|
| CCP-2F.F.F | 9.00% | S → N [° C.]: | <−40.0 |
| CCP-3F.F.F | 3.00% | Clearing point [° C.]: | +68.5 |
| CCP-20CF$_3$ | 8.00% | $\Delta n$ [589 nm, 20° C.]: | +0.1052 |
| CCP-30CF$_3$ | 6.00% | d · $\Delta n$ [20° C.]: | 0.50 |
| CGZP-2-OT | 11.00% | Twist [°]: | 90 |
| CCZU-2-F | 4.00% | $V_{10}$ [V]: | 0.96 |
| CCZU-3-F | 13.00% | | |
| PUQU-2-F | 12.00% | | |
| PUQU-3-F | 11.00% | | |
| PGU-2-F | 9.00% | | |
| CC-3-V1 | 9.00% | | |
| CCP-V-1 | 5.00% | | |

Example 49

| | | | |
|---|---|---|---|
| CCH-35 | 4.00% | Clearing point [° C.]: | +81.0 |
| CCP-20CF$_3$ | 2.00% | $\Delta n$ [589 nm, 20° C.]: | +0.1054 |
| CCP-30CF$_3$ | 7.00% | $\gamma_1$ [20° C., mPa · s]: | 163 |
| CCP-40CF$_3$ | 6.50% | d · $\Delta n$ [20° C.]: | 0.50 |
| CCP-2F.F.F | 10.00% | Twist [°]: | 90 |
| CGZP-2-OT | 14.00% | $V_{10}$ [V]: | 0.94 |
| CGZP-3-OT | 10.00% | | |
| CCZU-2-F | 4.00% | | |
| CCZU-3-F | 15.00% | | |
| CCZU-5-F | 3.00% | | |
| PGU-2-F | 4.50% | | |
| PUQU-3-F | 20.00% | | |

Example 50

| | | | |
|---|---|---|---|
| CC-3-V1 | 4.00% | S → N [° C.]: | <−30.0 |
| CCH-35 | 5.00% | Clearing point [° C.]: | +74.0 |
| CC-5-V | 18.00% | $\Delta n$ [589 nm, 20° C.]: | +0.0807 |
| CCP-20CF$_3$ | 8.00% | $\gamma_1$ [20° C., mPa · s]: | 86 |
| CCP-30CF$_3$ | 8.00% | d · $\Delta n$ [20° C.]: | 0.50 |
| CCP-2F.F.F | 10.00% | Twist [°]: | 90 |
| CCP-3F.F.F | 8.00% | $V_{10}$ [V]: | 1.31 |
| CGZP-2-OT | 4.00% | | |
| CCZU-2-F | 4.00% | | |
| CCZU-3-F | 15.00% | | |
| PUQU-3-F | 16.00% | | |

Example 51

| | | | |
|---|---|---|---|
| CCP.2F.F.F | 10.00% | S → N [° C.]: | <−40.0 |
| CCP-3F.F.F | 10.00% | Clearing point [° C.]: | +80.0 |
| CCP-20CF$_3$.F | 10.00% | $\Delta n$ [589 nm, 20° C.]: | +0.0804 |
| CCP-20CF$_3$ | 8.00% | $\gamma_1$ [20° C., mPa · s]: | 112 |
| CCP-30CF$_3$ | 5.00% | d · $\Delta n$ [20° C.]: | 0.50 |
| CCP-40CF$_3$ | 4.00% | Twist [°]: | 90 |
| CCZU-2-F | 5.00% | $V_{10}$ [V]: | 0.96 |
| CCZU-3-F | 15.00% | | |
| CCZU-5-F | 4.00% | | |
| PUQU-3-F | 13.00% | | |
| CCH-35 | 5.00% | | |
| CC-5-V | 11.00% | | |

Example 52

| | | | |
|---|---|---|---|
| CCP-2F.F.F | 10.00% | S → N [° C.]: | <−40.0 |
| CCP-20CF$_3$ | 8.00% | Clearing point [° C.]: | +71.0 |
| CCP-30CF$_3$ | 5.00% | $\Delta n$ [589 nm, 20° C.]: | +0.1047 |
| CGZP-2-OT | 12.00% | $\gamma_1$ [20° C., mPa · s]: | 125 |
| CGZP-3-OT | 4.00% | d · $\Delta n$ [20° C.]: | 0.50 |
| CCZU-2-F | 5.00% | Twist [°]: | 90 |
| CCZU-3-F | 12.00% | $V_{10}$ [V]: | 0.96 |
| PUQU-3-F | 20.00% | | |
| CGU-2-F | 3.00% | | |
| PGU-2-F | 8.00% | | |
| CC-3-V1 | 3.50% | | |
| CCH-35 | 5.00% | | |
| CCP-V-1 | 4.50% | | |

Example 53

| | | | |
|---|---|---|---|
| CCP-2F.F.F | 10.00% | S → N [° C.]: | <−40.0 |
| CCP-20CF$_3$ | 8.00% | Clearing point [° C.]: | +68.5 |
| CCP-30CF$_3$ | 8.00% | $\Delta n$ [589 nm, 20° C.]: | +0.1043 |
| CCP-40CF$_3$ | 4.00% | $\gamma_1$ [20° C., mPa · s]: | 126 |
| CGZP-2-OT | 12.00% | d · $\Delta n$ [20° C.]: | 0.50 |
| CCZU-2-F | 5.00% | Twist [°]: | 90 |
| CCZU-3-F | 15.00% | $V_{10}$ [V]: | 0.91 |
| PUQU-3-F | 22.00% | | |
| PGU-2-F | 9.00% | | |
| PGU-3-F | 1.00% | | |
| CC-3-V1 | 3.50% | | |
| CCH-35 | 2.50% | | |

Example 54

| | | | |
|---|---|---|---|
| CCP-2F.F.F | 9.00% | S → N [° C.]: | <−40.0 |
| CCP-3F.F.F | 9.00% | Clearing point [° C.]: | +69.0 |
| CCP-20CF$_3$.F | 5.00% | $\Delta n$ [589 nm, 20° C.]: | +0.1049 |
| CCP-20CF$_3$ | 8.00% | $\gamma_1$ [20° C., mPa · s]: | 144 |
| CCP-30CF$_3$ | 7.00% | d · $\Delta n$ [20° C.]: | 0.50 |
| CCP-40CF$_3$ | 4.00% | Twist [°]: | 90 |
| CCZU-2-F | 5.00% | $V_{10}$ [V]: | 0.92 |
| CCZU-3-F | 15.00% | | |
| PUQU-3-F | 25.00% | | |
| PGU-2-F | 8.00% | | |
| PGU-3-F | 2.00% | | |
| CBC-33 | 3.00% | | |

Example 55

| | | | |
|---|---|---|---|
| CC-3-V | 18.00% | Clearing point [° C.]: | +79.5 |
| CC-3-V1 | 9.00% | $\Delta n$ [589 nm, 20° C.]: | +0.1014 |
| CCH-35 | 3.00% | d · $\Delta n$ [20° C.]: | 0.50 |
| CC-5-V | 2.00% | Twist [°]: | 90 |
| CCP-30CF$_3$ | 7.00% | $V_{10}$ [V]: | 1.58 |
| CCP-20CF$_3$ | 6.00% | | |
| PGU-2-F | 7.00% | | |

| | | | |
|---|---|---|---|
| PUQU-2-F | 7.00% | | |
| PUQU-3-F | 11.00% | | |
| CGZP-3-OT | 6.00% | | |
| CCG-V-F | 5.00% | | |
| CCP-V-1 | 16.00% | | |
| BCH-32 | 3.00% | | |

Example 56

| | | | |
|---|---|---|---|
| CC-3-V1 | 11.00% | S → N [° C.]: | <−79.5 |
| PCH-53 | 2.00% | Clearing point [° C.]: | +40.0 |
| CC-5-V | 8.00% | Δn [589 nm, 20° C.]: | +0.1040 |
| CCP-20CF$_3$ | 8.00% | d · Δn [20° C.]: | 0.50 |
| CCP-30CF$_3$ | 8.00% | Twist [°]: | 90 |
| CCG-V-F | 16.00% | V$_{10}$ [V]: | 1.59 |
| BCH-2F.F | 8.00% | | |
| BCH-3F.F | 8.00% | | |
| BCH-3F.F.F | 8.00% | | |
| PUQU-2-F | 5.00% | | |
| PUQU-3-F | 9.00% | | |
| BCH-32 | 4.00% | | |
| CCP-V-1 | 5.00% | | |

Example 57

| | | | |
|---|---|---|---|
| CC-3-V | 20.00% | Clearing point [° C.]: | +81.0 |
| CC-3-V1 | 11.00% | Δn [589 nm, 20° C.]: | +0.0994 |
| CCP-30CF$_3$ | 8.00% | d · Δn [20° C.]: | 0.50 |
| CCP-20CF$_3$ | 8.00% | Twist [°]: | 90 |
| PGU-2-F | 8.00% | V$_{10}$ [V]: | 1.55 |
| PUQU-3-F | 12.00% | | |
| CGZP-2-OT | 9.00% | | |
| CCZU-2-F | 4.00% | | |
| CCP-2F.F.F | 3.00% | | |
| CCG-V-F | 2.00% | | |
| CCP-V-1 | 11.00% | | |
| BCH-32 | 4.00% | | |

Example 58

| | | | |
|---|---|---|---|
| CC-3-V | 19.00% | S → N [° C.]: | <−40.0 |
| CC-3-V1 | 8.00% | Clearing point [° C.]: | +80.0 |
| CCZU-2-F | 4.00% | Δn [589 nm, 20° C.]: | +0.1008 |
| CCG-V-F | 9.00% | d · Δn [20° C.]: | 0.50 |
| PUQU-2-F | 7.00% | Twist [°]: | 90 |
| PUQU-3-F | 11.00% | V$_{10}$ [V]: | 1.34 |
| PGU-2-F | 4.00% | | |
| CGZP-2-OT | 11.00% | | |
| CGZP-3-OT | 6.00% | | |
| CCP-40CF$_3$ | 8.00% | | |
| CCP-30CF$_3$ | 8.00% | | |
| BCH-32 | 3.00% | | |
| CBC-33 | 2.00% | | |

Example 59

| | | | |
|---|---|---|---|
| CC-3-V1 | 10.00% | Clearing point [° C.]: | +79.5 |
| CC-5-V | 8.00% | Δn [589 nm, 20° C.]: | +0.1040 |
| PCH-301 | 4.00% | d · Δn [20° C.]: | 0.50 |
| CCH-35 | 4.00% | Twist [°]: | 90 |
| CCZU-2-F | 4.00% | V$_{10}$ [V]: | 1.28 |
| CCZU-3-F | 11.00% | | |
| PUQU-2-F | 7.00% | | |
| PUQU-3-F | 10.00% | | |
| PGU-2-F | 7.00% | | |
| CGZP-2-OT | 11.00% | | |
| CGZP-3-OT | 7.00% | | |
| CCP-20CF$_3$ | 8.00% | | |
| CCP-30CF$_3$ | 7.00% | | |
| CBC-33 | 2.00% | | |

Example 60

| | | | |
|---|---|---|---|
| CCH-35 | 4.00% | S → N [° C.]: | <−40.0 |
| CC-5-V | 12.00% | Clearing point [° C.]: | +80.5 |
| PCH-53 | 4.00% | Δn [589 nm, 20° C.]: | +0.0808 |
| CC-3-V1 | 10.00% | γ$_1$ [20° C., mPa · s]: | 81 |
| CCG-V-F | 20.00% | d · Δn [20° C.]: | 0.50 |
| CCP-2F.F.F | 10.00% | Twist [°]: | 90 |
| CCP-3F.F.F | 10.00% | V$_{10}$ [V]: | 1.82 |
| PUQU-3-F | 9.00% | | |
| CCP-20CF$_3$ | 8.00% | | |
| CCP-30CF$_3$ | 5.00% | | |
| CCP-V-1 | 8.00% | | |

Example 61

| | | | |
|---|---|---|---|
| CC-5-V | 15.00% | Clearing point [° C.]: | +79.5 |
| CC-3-V1 | 9.00% | Δn [589 nm, 20° C.]: | +0.1042 |
| CCZU-2-F | 4.00% | d · Δn [20° C.]: | 0.50 |
| CCZU-3-F | 4.00% | Twist [°]: | 90 |
| PUQU-3-F | 18.00% | V$_{10}$ [V]: | 1.30 |
| PGU-2-F | 6.00% | | |
| CGZP-2-OT | 11.00% | | |
| CGZP-3-OT | 9.00% | | |
| CCP-20CF$_3$ | 8.00% | | |
| CCP-30CF$_3$ | 8.00% | | |
| CCG-V-V | 4.00% | | |
| BCH-32 | 2.00% | | |
| CCP-V-1 | 2.00% | | |

Example 62

| | | | |
|---|---|---|---|
| CC-3-V | 18.00% | S → N [° C.]: | <−40.0 |
| CC-3-V1 | 6.00% | Clearing point [° C.]: | +79.0 |
| CCZU-2-F | 4.00% | Δn [589 nm, 20° C.]: | +0.1046 |
| CCZU-3-F | 8.00% | γ$_1$ [20° C., mPa · s]: | 88 |
| PUQU-2-F | 7.00% | d · Δn [20° C.]: | 0.50 |
| PUQU-3-F | 11.00% | Twist [°]: | 90 |
| PGU-2-F | 6.00% | V$_{10}$ [V]: | 1.25 |
| CGZP-2-OT | 11.00% | | |
| CGZP-3-OT | 9.00% | | |
| CCP-20CF$_3$ | 8.00% | | |
| CCP-30CF$_3$ | 8.00% | | |
| BCH-32 | 2.00% | | |
| CBC-33 | 2.00% | | |

Example 63

| | | | |
|---|---|---|---|
| CC-5-V | 8.00% | Clearing point [° C.]: | +81.5 |
| CC-3-V1 | 8.00% | Δn [589 nm, 20° C.]: | +0.1052 |
| CC-3-2V | 8.00% | d · Δn [20° C.]: | 0.50 |
| CCH-35 | 4.00% | Twist [°]: | 90 |
| CCZU-2-F | 4.00% | V$_{10}$ [V]: | 1.35 |
| CCZU-3-F | 5.00% | | |
| PUQU-2-F | 7.00% | | |
| PUQU-3-F | 11.00% | | |
| PGU-2-F | 7.00% | | |
| CGZP-2-OT | 11.00% | | |
| CGZP-3-OT | 9.00% | | |
| CCP-20CF$_3$ | 8.00% | | |
| CCP-30CF$_3$ | 8.00% | | |
| CBC-33 | 2.00% | | |

Example 64

| | |
|---|---|
| CCH-301 | 12.00% |
| CC-3-V1 | 11.00% |
| CCH-35 | 5.00% |
| CCZU-2-F | 4.00% |
| CCZU-3-F | 5.00% |
| PUQU-2-F | 7.00% |
| PUQU-3-F | 11.00% |
| PGU-2-F | 7.00% |
| CGZP-2-OT | 11.00% |
| CGZP-3-OT | 9.00% |
| CCP-20CF$_3$ | 8.00% |
| CCP-30CF$_3$ | 8.00% |
| CBC-33 | 2.00% |

Example 65

| | |
|---|---|
| CC-5-V | 10.00% |
| PCH-301 | 4.00% |
| CC-3-V1 | 10.00% |
| CCH-35 | 4.00% |
| CCZU-2-F | 4.00% |
| CCZU-3-F | 5.00% |
| PUQU-2-F | 7.00% |
| PUQU-3-F | 11.00% |
| PGU-2-F | 7.00% |
| CGZP-2-OT | 11.00% |
| CGZP-3-OT | 9.00% |
| CCP-40CF$_3$ | 8.00% |
| CCP-30CF$_3$ | 8.00% |
| CBC-33 | 2.00% |

Example 66

| | | | |
|---|---|---|---|
| CC-3-V1 | 10.00% | Clearing point [° C.]: | +80.5 |
| CC-3-2V | 10.00% | Δn [589 nm, 20° C.]: | +0.1060 |
| CCH-301 | 3.00% | d · Δn [20° C.]: | 0.50 |
| CCH-35 | 4.00% | Twist [°]: | 90 |
| CCZU-2-F | 4.00% | $V_{10}$ [V]: | 1.27 |
| CCZU-3-F | 10.00% | | |
| PUQU-2-F | 7.00% | | |
| PUQU-3-F | 11.00% | | |
| PGU-2-F | 8.00% | | |
| CGZP-2-OT | 11.00% | | |
| CGZP-3-OT | 9.00% | | |
| CCP-20CF$_3$ | 3.00% | | |

Example 67

| | | | |
|---|---|---|---|
| CCP-2F.F.F | 9.00% | S → N [° C.]: | <−40.0 |
| CCP-3F.F.F | 10.00% | Clearing point [° C.]: | +73.0 |
| CCQU-2-F | 11.00% | Δn [589 nm, 20° C.]: | +0.0667 |
| CCQU-3-F | 11.00% | | |
| CCQU-5-F | 4.00% | | |
| CCZU-2-F | 4.00% | | |
| CCZU-3-F | 14.00% | | |
| CCP-20CF$_3$.F | 5.00% | | |
| CCCG-V-F | 5.00% | | |
| CGU-2-F | 3.00% | | |
| CC-5-V | 14.00% | | |
| CCH-501 | 7.00% | | |
| PCH-7F | 3.00% | | |

Example 68

| | | | |
|---|---|---|---|
| CC-5-V | 11.00% | S → N [° C.]: | <−40.0 |
| CC-3-V1 | 7.00% | Clearing point [° C.]: | +79.5 |
| BCCP-3F.F | 6.00% | Δn [589 nm, 20° C.]: | +0.1006 |
| BCCP-5F.F | 6.00% | γ$_1$ [20° C., mPa · s]: | 114 |
| CCQU-2-F | 10.00% | d · Δn [20° C.]: | 0.50 |
| CCQU-3-F | 10.00% | Twist [°]: | 90 |
| BCH-3F.F.F | 15.00% | $V_{10}$ [V]: | 1.54 |
| BCH-2F.F | 8.00% | | |
| BCH-3F.F | 8.00% | | |
| CGU-2-F | 10.00% | | |
| BCH-32 | 5.00% | | |
| CCP-V-1 | 4.00% | | |

Example 69

| | | | |
|---|---|---|---|
| CC-5-V | 11.00% | Clearing point [° C.]: | +88.0 |
| CCH-35 | 4.00% | Δn [589 nm, 20° C.]: | +0.0801 |
| CGU-2-F | 10.00% | d · Δn [20° C.]: | 0.50 |
| CGU-3-F | 10.00% | Twist [°]: | 90 |
| CCP-2F.F.F | 5.00% | $V_{10}$ [V]: | 1.59 |
| CCQG-2-F | 14.00% | | |
| CCQG-3-F | 14.00% | | |
| CCQG-5-F | 10.00% | | |
| ECCP-3F.F | 12.00% | | |
| ECCP-5F.F | 10.00% | | |

Example 70

| | | | |
|---|---|---|---|
| CC-3-V1 | 5.00% | S → N [° C.]: | <−20.0 |
| CCH-35 | 5.00% | Clearing point [° C.]: | +77.5 |
| CC-5-V | 18.00% | Δn [589 nm, 20° C.]: | +0.0800 |
| CCQU-2-F | 11.50% | d · Δn [20° C.]: | 0.50 |
| CCQU-3-F | 12.00% | Twist [°]: | 90 |
| CGU-2-F | 9.00% | $V_{10}$ [V]: | 1.29 |
| CGU-3-F | 6.00% | | |
| CCZU-2-F | 4.00% | | |
| CCZU-3-F | 15.00% | | |
| CGZP-2-OT | 10.50% | | |
| CGZP-3-OT | 4.00% | | |

Example 71

| | | | |
|---|---|---|---|
| CCP-2F.F.F | 9.00% | S → N [° C.]: | <−40.0 |
| CCP-3F.F.F | 10.00% | Clearing point [° C.]: | +76.0 |
| CCQU-2-F | 11.00% | Δn [589 nm, 20° C.]: | +0.0671 |
| CCQU-3-F | 11.00% | Δε [1 kHz, 20° C.]: | 8.0 |
| CCQU-5-F | 4.00% | | |
| CCZU-2-F | 4.00% | | |
| CCZU-3-F | 14.00% | | |
| CCP-20CF$_3$.F | 5.00% | | |
| CCG-V-F | 5.00% | | |
| CGU-2-F | 3.00% | | |
| CC-5-V | 16.00% | | |
| CCH-501 | 7.00% | | |
| PCH-7F | 1.00% | | |

Example 72

| | | | |
|---|---|---|---|
| CCP-2F.F.F | 8.00% | Clearing point [° C.]: | +80.5 |
| CCP-3F.F.F | 8.00% | Δn [589 nm, 20° C.]: | +0.0838 |
| CCP-5F.F.F | 7.00% | d · Δn [20° C.]: | 0.50 |
| CCP-20CF$_3$ | 8.00% | Twist [°]: | 90 |
| CCP-30CF$_3$ | 8.00% | $V_{10}$ [V]: | 1.27 |
| CGU-2-F | 10.00% | | |
| CGU-3-F | 3.00% | | |
| BCH-3F.F.F | 7.00% | | |
| CCG-V-F | 10.00% | | |
| CC-3-V1 | 4.00% | | |
| CCQU-2-F | 8.00% | | |
| CCQU-3-F | 10.00% | | |
| CCQU-5-F | 9.00% | | |

Example 73

| | | | |
|---|---|---|---|
| CCP-2F.F.F | 10.00% | S → N [° C.]: | <−40.0 |
| CCP-3F.F.F | 10.00% | Clearing point [° C.]: | +82.5 |
| CCP-5F.F.F | 4.00% | Δn [589 nm, 20° C.]: | +0.0791 |
| CCP-20CF$_3$ | 8.00% | d · Δn [20° C.]: | 0.50 |
| CCP-30CF$_3$ | 8.00% | Twist [°]: | 90 |
| CCP-40CF$_3$ | 4.00% | $V_{10}$ [V]: | 1.38 |
| CCZU-2-F | 5.00% | | |
| CCZU-3-F | 15.00% | | |
| CCZU-5-F | 4.00% | | |
| PUQU-3-F | 12.00% | | |
| CCH-35 | 5.00% | | |
| CC-5-V | 15.00% | | |
| CGZP-2-OT | 0.00% | | |

Example 74

| | | | |
|---|---|---|---|
| CCP-2F.F.F | 10.00% | S → N [° C.]: | <−40.0 |
| CCP-20CF$_3$ | 8.00% | Clearing point [° C.]: | +71.5 |
| CCP-30CF$_3$ | 4.00% | Δn [589 nm, 20° C.]: | +0.1044 |
| CGZP-2-OT | 12.00% | Δε [1 kHz, 20° C.]: | 14.5 |
| CGZP-3-OT | 4.00% | γ$_1$ [20° C., mPa · s]: | 115 |
| CCZU-2-F | 4.00% | d · Δn [20° C.]: | 0.50 |
| CCZU-3-F | 9.00% | Twist [°]: | 90 |
| PUQU-3-F | 20.00% | $V_{10}$ [V]: | 1.02 |
| CGU-2-F | 5.00% | | |
| PGU-2-F | 6.00% | | |
| CC-3-V1 | 9.00% | | |
| CCH-35 | 2.00% | | |
| CCP-V-1 | 7.00% | | |

Example 75

| | | | |
|---|---|---|---|
| ME2N.F | 2.00% | Clearing point [° C.]: | +89.9 |
| ME3N.F | 3.50% | Δn [589 nm, 20° C.]: | +0.1380 |
| ME4N.F | 6.00% | Δε [1 kHz, 20° C.]: | 13.9 |
| PCH-3N.F.F | 14.00% | γ$_1$ [20° C., mPa · s]: | 140 |
| CC-5-V | 12.00% | | |
| CC-3-V1 | 5.00% | | |
| CCP-V-1 | 8.00% | | |
| CCP-V2-1 | 4.00% | | |
| CVCP-V-O1 | 5.00% | | |
| PPTUI-3-2 | 14.50% | | |
| PTP-201 | 3.00% | | |
| CCPC-33 | 3.00% | | |
| CCQU-2-F | 10.00% | | |
| CCQU-3-F | 10.00% | | |

Example 76

| | | | |
|---|---|---|---|
| CC-3-V1 | 9.00% | S → N [° C.]: | <−40.0 |
| CC-5-V | 12.00% | Clearing point [° C.]: | +85.5 |
| CCQU-2-F | 12.00% | Δn [589 nm, 20° C.]: | +0.0775 |
| CCQU-3-F | 11.00% | γ$_1$ · [20° C., mPa · s]: | 115 |
| CCP-3F.F.F | 7.00% | d · Δn [20° C.]: | 0.50 |
| CCQG-2-F | 12.00% | Twist [°]: | 90 |
| CCQG-3-F | 12.00% | $V_{10}$ [V]: | 1.55 |
| CCQG-5-F | 8.00% | | |
| CGU-2-F | 5.00% | | |
| BCH-3F.F.F | 12.00% | | |

Example 77

| | | | |
|---|---|---|---|
| CC-5-V | 10.00% | S → N [° C.]: | <−40.0 |
| CC-3-V1 | 8.00% | Clearing point [° C.]: | +79.0 |
| CCQG-2-F | 10.00% | Δn [589 nm, 20° C.]: | +0.0996 |
| CCQG-3-F | 11.00% | d · Δn [20° C.]: | 0.50 |
| CCQU-2-F | 11.00% | Twist [°]: | 90 |
| BCH-3F.F.F | 15.00% | $V_{10}$ [V]: | 1.49 |
| BCH-2F.F | 8.00% | | |
| BCH-3F.F | 8.00% | | |
| CGU-2-F | 10.00% | | |
| BCH-32 | 5.00% | | |
| CCP-V-1 | 4.00% | | |

Example 78

| | | | |
|---|---|---|---|
| CCP-30CF$_3$ | 8.00% | S → N [° C.]: | <−40.0 |
| CCP-40CF$_3$ | 6.00% | Clearing point [° C.]: | +78.5 |
| CCP-2F.F.F | 7.00% | Δn [589 nm, 20° C.]: | +0.1042 |
| CGZP-2-OT | 14.00% | γ$_1$ [20° C., mPa · s]: | 178 |
| CGZP-3-OT | 10.00% | d · Δn [20° C.]: | 0.50 |
| CCZU-2-F | 4.00% | Twist [°]: | 90 |
| CCZU-3-F | 15.00% | $V_{10}$ [V]: | 0.93 |
| CCZU-5-F | 3.00% | | |
| CGU-2-F | 4.00% | | |
| PGU-2-F | 10.00% | | |
| CUQU-3-F | 16.00% | | |
| CCP-V-1 | 3.00% | | |

Example 79

| | | | |
|---|---|---|---|
| CCP-30CF$_3$ | 8.00% | Clearing point [° C.]: | +80.5 |
| CCP-40CF$_3$ | 6.00% | Δn [589 nm, 20° C.]: | +0.1060 |
| CCP-50CF$_3$ | 2.00% | γ$_1$ [20° C., mPa · s]: | 181 |
| CCP-2F.F.F | 7.00% | d · Δn [20° C.]: | 0.50 |
| CGZP-2-OT | 13.50% | Twist [°]: | 90 |
| CGZP-3-OT | 9.50% | $V_{10}$ [V]: | 0.97 |
| CCZU-2-F | 4.00% | | |
| CCZU-3-F | 15.00% | | |
| CCZU-5-F | 3.00% | | |
| CGU-3-F | 2.00% | | |
| PGU-2-F | 9.00% | | |
| PGU-3-F | 3.00% | | |
| CUQU-2-F | 7.00% | | |
| CUQU-3-F | 9.00% | | |
| CCP-V-1 | 2.00% | | |

Example 80

| | | | |
|---|---|---|---|
| CCP-20CF$_3$ | 8.00% | S → N [° C.]: | <−40.0 |
| CCP-30CF$_3$ | 8.00% | Clearing point [° C.]: | +72.0 |
| CGZP-2-OT | 12.00% | Δn [589 nm, 20° C.]: | +0.1056 |
| CGZP-3-OT | 8.00% | γ$_1$ [20° C., mPa · s]: | 131 |
| CCZU-2-F | 3.00% | d · Δn [20° C.]: | 0.50 |
| CCZU-3-F | 13.00% | Twist [°]: | 90 |
| CUQU-2-F | 6.00% | $V_{10}$ [V]: | 1.02 |
| CUQU-3-F | 6.00% | | |
| CUQU-5-F | 2.00% | | |
| CGU-2-F | 5.00% | | |
| CGU-3-F | 6.00% | | |
| PGU-2-F | 7.00% | | |
| PGU-3-F | 5.00% | | |
| CC-3-V1 | 9.00% | | |
| CCH-35 | 2.00% | | |

Example 81

| | | | |
|---|---|---|---|
| CC-3-V | 4.00% | S → N [° C.]: | <−30.0 |
| CCP-30CF$_3$ | 8.00% | Clearing point [° C.]: | +79.5 |
| CCP-40CF$_3$ | 7.50% | Δn [589 nm, 20° C.]: | +0.1058 |
| CCP-2F.F.F | 10.00% | γ$_1$ [20° C., mPa · s]: | 157 |
| CGZP-2-OT | 14.00% | d · Δn [20° C.]: | 0.50 |
| CGZP-3-OT | 10.00% | Twist [°]: | 90 |
| CCZU-2-F | 4.00% | $V_{10}$ [V]: | 0.95 |
| CCZU-3-F | 15.00% | | |
| CCZU-5-F | 3.00% | | |
| PGU-2-F | 4.50% | | |
| PUQU-3-F | 20.00% | | |

Example 82

| | | | |
|---|---|---|---|
| CC-3-V1 | 8.00% | Clearing point [° C.]: | +87.5 |
| CC-5-V | 8.00% | Δn [589 nm, 20° C.]: | +0.0876 |
| CCQU-2-F | 12.00% | d · Δn [20° C.]: | 0.50 |
| CCQU-3-F | 13.00% | Twist [°]: | 90 |
| CCP-2F.F.F | 4.00% | $V_{10}$ [V]: | 1.58 |
| CCG-V-F | 4.00% | | |
| BCH-3F.F.F | 7.00% | | |
| CGU-2-F | 10.00% | | |
| CGU-3-F | 6.00% | | |
| ECCP-3F.F | 8.00% | | |
| ECCP-5F.F | 8.00% | | |
| CCP-V-1 | 11.00% | | |
| CBC-33 | 1.00% | | |

Example 83

| | | | |
|---|---|---|---|
| CC-5-V | 8.00% | S → N [° C.]: | <−40.0 |
| CC-3-V1 | 7.00% | Clearing point [° C.]: | +80.5 |
| ECCP-3F.F | 8.00% | Δn [589 nm, 20° C.]: | +0.0978 |
| ECCP-5F.F | 8.00% | d · Δn [20° C.]: | 0.50 |
| CCQU-2-F | 12.00% | Twist [°]: | 90 |
| CCQU-3-F | 11.00% | $V_{10}$ [V]: | 1.50 |
| BCH-3F.F.F | 15.00% | | |
| BCH-2F.F | 8.00% | | |
| BCH-3F.F | 5.00% | | |
| CGU-2-F | 10.00% | | |
| BCH-32 | 5.00% | | |
| CCP-V-1 | 3.00% | | |

Example 84

| | | | |
|---|---|---|---|
| CCP-2F.F.F | 8.00% | S → N [° C.]: | <−40.0 |
| CCP-20CF$_3$ | 6.00% | Clearing point [° C.]: | +79.5 |
| CCP-30CF$_3$ | 4.00% | Δn [589 nm, 20° C.]: | +0.0855 |
| CGU-2-F | 10.00% | d · Δn [20° C.]: | 0.50 |
| CGU-3-F | 4.00% | Twist [°]: | 90 |
| BCH-3F.F.F | 7.00% | $V_{10}$ [V]: | 1.24 |
| BCH-32 | 2.00% | | |
| CCZU-2-F | 4.00% | | |
| CCZU-3-F | 14.00% | | |
| CCG-V-F | 10.00% | | |
| CC-3-V1 | 9.00% | | |
| CCQU-2-F | 11.00% | | |
| CCQU-3-F | 11.00% | | |

Example 85

| | | | |
|---|---|---|---|
| CCP-2F.F.F | 10.00% | S → N [° C.]: | <−40.0 |
| CCP-3F.F.F | 10.00% | Clearing point [° C.]: | +79.0 |
| CCP-5F.F.F | 5.00% | Δn [589 nm, 20° C.]: | +0.0865 |
| CCP-20CF$_3$ | 8.00% | d · Δn [20° C.]: | 0.50 |
| CCP-30CF$_3$ | 8.00% | Twist [°]: | 90 |
| CGU-2-F | 10.00% | $V_{10}$ [V]: | 1.24 |
| CGU-3-F | 5.00% | | |
| BCH-3F.F.F | 6.00% | | |
| BCH-32 | 2.00% | | |
| CCG-V-F | 6.00% | | |
| CC-3-V1 | 3.00% | | |
| CCQU-2-F | 8.00% | | |
| CCQU-3-F | 10.00% | | |
| CCQU-5-F | 11.00% | | |

Example 86

| | | | |
|---|---|---|---|
| CC-5-V | 18.00% | S → N [° C.]: | <−40.0 |
| CC-3-V1 | 7.00% | Clearing point [° C.]: | +72.0 |
| CCH-35 | 3.00% | Δn [589 nm, 20° C.]: | +0.0842 |
| CCG-V-F | 4.00% | γ$_1$ [20° C., mPa · s]: | 93 |
| CCQU-2-F | 10.00% | d · Δn [20° C.]: | 0.50 |
| CCQU-3-F | 7.00% | Twist [°]: | 90 |
| BCH-3F.F.F | 7.00% | $V_{10}$ [V]: | 1.28 |
| CGU-2-F | 10.00% | | |
| CGU-3-F | 8.00% | | |
| CCZU-2-F | 3.00% | | |
| CCZU-3-F | 12.00% | | |
| CGZP-2-OT | 8.00% | | |
| CGZP-3-OT | 2.00% | | |
| CCP-V-1 | 1.00% | | |

Example 87

| | | | |
|---|---|---|---|
| CCP-20CF$_3$ | 8.00% | S → N [° C.]: | <−40.0 |
| CCP-30CF$_3$ | 7.00% | Clearing point [° C.]: | +80.5 |
| CCP-40CF$_3$ | 3.00% | Δn [589 nm, 20° C.]: | +0.0897 |
| CCP-50CF$_3$ | 5.00% | d · Δn [20° C.]: | 0.50 |
| CCP-2F.F.F | 10.00% | Twist [°]: | 90 |
| CCP-3F.F.F | 5.00% | $V_{10}$ [V]: | 1.22 |

| | |
|---|---|
| CGU-2-F | 11.00% |
| CGU-3-F | 6.00% |
| BCH-3F.F.F | 9.00% |
| BCH-32 | 3.00% |
| CCQU-2-F | 11.00% |
| CCQU-3-F | 11.00% |
| CCQU-5-F | 11.00% |

Example 88

| | | | |
|---|---|---|---|
| CGZP-2-OT | 12.00% | S → N [° C.]: | <−40.0 |
| CGZP-3-OT | 3.00% | Clearing point [° C.]: | +69.0 |
| CC-5-V | 20.00% | Δn [589 nm, 20° C.]: | +0.0900 |
| CC-3-V1 | 10.00% | $\gamma_1$ [20° C., mPa · s]: | 88 |
| CCP-2F.F.F | 4.00% | d · Δn [20° C.]: | 0.50 |
| CCP-20CF$_3$ | 2.00% | Twist [°]: | 90 |
| BCH-3F.F.F | 8.00% | $V_{10}$ [V]: | 1.34 |
| CGU-2-F | 10.00% | | |
| CGU-3-F | 10.00% | | |
| BCH-32 | 4.00% | | |
| CCQU-2-F | 10.00% | | |
| CCQU-3-F | 7.00% | | |

Example 89

| | | | |
|---|---|---|---|
| CC-5-V | 9.00% | S → N [° C.]: | <−40.0 |
| CC-3-V1 | 10.00% | Clearing point [° C.]: | +79.0 |
| CCQG-2-F | 12.00% | Δn [589 nm, 20° C.]: | +0.0998 |
| CCQG-3-F | 12.00% | $\gamma_1$ [20° C., mPa · s]: | 114 |
| CCQG-5-F | 9.00% | d · Δn [20° C.]: | 0.50 |
| BCH-2F.F | 8.00% | Twist [°]: | 90 |
| BCH-3F.F | 7.00% | $V_{10}$ [V]: | 1.51 |
| BCH-3F.F.F | 14.00% | | |
| CGU-2-F | 10.00% | | |
| CGU-3-F | 5.00% | | |
| BCH-32 | 4.00% | | |

Example 90

| | | | |
|---|---|---|---|
| CC-5-V | 8.00% | S → N [° C.]: | <−40.0 |
| CC-3-V1 | 10.00% | Clearing point [° C.]: | +80.0 |
| CCQG-2-F | 12.00% | Δn [589 nm, 20° C.]: | +0.0978 |
| CCQG-3-F | 12.00% | d · Δn [20° C.]: | 0.50 |
| CCQG-5-F | 10.00% | Twist [°]: | 90 |
| BCH-2F.F | 8.00% | $V_{10}$ [V]: | 1.51 |
| BCH-3F.F | 6.00% | | |
| BCH-3F.F.F | 15.00% | | |
| CGU-2-F | 10.00% | | |
| CGU-3-F | 5.00% | | |
| CCP-V-1 | 2.00% | | |
| BCH-32 | 2.00% | | |

Example 91

| | | | |
|---|---|---|---|
| CCP-2F.F.F | 10.00% | S → N [° C.]: | <−40.0 |
| CCP-3F.F.F | 10.00% | Clearing point [° C.]: | +74.5 |
| CCP-5F.F.F | 4.00% | Δn [589 nm, 20° C.]: | +0.0930 |
| CCQG-2-F | 10.00% | $\gamma_1$ [20° C., mPa · s]: | 155 |
| CCQG-3-F | 10.00% | d · Δn [20° C.]: | 0.50 |
| CCP-20CF$_3$ | 8.00% | Twist [°]: | 90 |
| CCP-30CF$_3$ | 7.00% | $V_{10}$ [V]: | 1.19 |
| CCP-50CF$_3$ | 4.00% | | |
| CGU-2-F | 11.00% | | |
| CGU-3-F | 11.00% | | |
| CGU-5-F | 6.00% | | |
| BCH-3F.F.F | 7.00% | | |
| BCH-32 | 2.00% | | |

Example 92

| | | | |
|---|---|---|---|
| CC-5-V | 6.00% | S → N [° C.]: | <−40.0 |
| CC-3-V1 | 10.00% | Clearing point [° C.]: | +82.0 |
| CCQG-2-F | 12.00% | Δn [589 nm, 20° C.]: | +0.1002 |
| CCQG-3-F | 12.00% | d · Δn [20° C.]: | 0.50 |
| CCQG-5-F | 10.00% | Twist [°]: | 90 |
| BCH-2F.F | 8.00% | $V_{10}$ [V]: | 1.46 |
| BCH-3F.F | 5.00% | | |
| BCH-3F.F.F | 15.00% | | |
| CGU-2-F | 10.00% | | |
| CGU-3-F | 6.00% | | |
| BCH-32 | 2.00% | | |
| CCP-V-1 | 4.00% | | |

Example 93

| | | | |
|---|---|---|---|
| CC-3-V1 | 6.00% | S → N [° C.]: | <−40.0 |
| CC-5-V | 13.00% | Clearing point [° C.]: | +86.5 |
| CCQG-2-F | 12.00% | Δn [589 nm, 20° C.]: | +0.08750 |
| CCQG-3-F | 12.00% | $\gamma_1$ [20° C., mPa · s]: | 121 |
| CCQG-5-F | 10.00% | d · Δn [20° C.]: | 0.50 |
| CCP-20CF$_3$ | 3.00% | Twist [°]: | 90 |
| CCP-30CF$_3$ | 5.00% | $V_{10}$ [V]: | 1.62 |
| ECCP-3F.F | 10.00% | | |
| BCH-3F.F.F | 10.00% | | |
| CGU-2-F | 10.00% | | |
| CGU-3-F | 7.00% | | |
| BCH-32 | 2.00% | | |

Example 94

| | | | |
|---|---|---|---|
| CC-5-V | 8.00% | S → N [° C.]: | <−40.0 |
| CC-3-V1 | 7.00% | Clearing point [° C.]: | +78.0 |
| ECCP-3F.F | 9.00% | Δn [589 nm, 20° C.]: | +0.0984 |
| ECCP-5F.F | 9.00% | d · Δn [20° C.]: | 0.50 |
| CCQU-2-F | 12.00% | Twist [°]: | 90 |
| CCQU-3-F | 11.00% | $V_{10}$ [V]: | 1.47 |
| BCH-3F.F.F | 15.00% | | |
| BCH-2F.F | 8.00% | | |
| BCH-3F.F | 6.00% | | |
| CGU-2-F | 10.00% | | |
| BCH-32 | 5.00% | | |

Example 95

| | | | |
|---|---|---|---|
| CCH-301 | 16.00% | Clearing point [° C.]: | +98.5 |
| CCH-501 | 18.00% | Δn [589 nm, 20° C.]: | +0.0606 |
| CC-5-V | 4.00% | d · Δn [20° C.]: | 0.50 |
| CCZU-2-F | 4.00% | Twist [°]: | 90 |
| CCZU-3-F | 13.00% | $V_{10}$ [V]: | 2.14 |
| CCZU-5-F | 4.00% | | |
| CCPC-33 | 3.00% | | |
| CCPC-34 | 3.00% | | |
| CCOC-3-3 | 3.00% | | |
| CCOC-4-3 | 4.00% | | |
| CCOC-3-5 | 3.00% | | |
| CCQPC-3-3 | 2.00% | | |
| CCQPC-2-3 | 2.00% | | |
| CCQU-2-F | 8.00% | | |
| CCQU-3-F | 8.00% | | |
| CCQU-5-F | 5.00% | | |

Example 96

| | |
|---|---|
| CC-3-V1 | 8.00% |
| CC-5-V | 6.00% |
| CCP-20CF$_3$ | 6.00% |
| CCQU-2-F | 11.00% |
| CCQU-3-F | 11.00% |
| CCP-2F.F.F | 6.00% |
| CGU-2-F | 11.00% |
| CGU-3-F | 10.00% |
| CCZU-2-F | 4.00% |
| CCZU-3-F | 14.00% |
| CGZP-2-OT | 11.00% |
| CGZP-3-OT | 2.00% |

Example 97

| | | | |
|---|---|---|---|
| CCP-2F.F.F | 6.00% | S → N [° C.]: | <−40.0 |
| CCP.3.F.F.F | 8.00% | Clearing point [° C.]: | +81.5 |
| CCP-5F.F.F | 4.00% | Δn [589 nm, 20° C.]: | +0.0808 |
| CGU-2-F | 10.00% | d · Δn [20° C.]: | 0.50 |
| CGU-3-F | 12.00% | Twist [°]: | 90 |
| CCZU-2-F | 5.00% | $V_{10}$ [V]: | 1.01 |
| CCZU-3-F | 14.00% | | |
| CCZU-5-F | 4.00% | | |
| CCQU-2-F | 10.00% | | |
| CCQU-3-F | 12.00% | | |
| CCQU-5-F | 8.00% | | |
| CCOC-3-3 | 2.00% | | |
| CCOC-4-3 | 3.00% | | |
| CCOC-3-5 | 2.00% | | |

Example 98

| | | | |
|---|---|---|---|
| CGU-2-F | 9.00% | Clearing point [° C.]: | +74.0 |
| CCZU-2-F | 5.00% | Δn [589 nm, 20° C.]: | +0.0783 |

-continued

| | |
|---|---|
| CCZU-3-F | 14.00% |
| CCZU-5-F | 4.00% |
| CCQU-2-F | 10.00% |
| CCQU-3-F | 12.00% |
| CCQU-5-F | 8.00% |
| CDU-2-F | 10.00% |
| CDU-3-F | 10.00% |
| CDU-5-F | 6.00% |
| CGZP-2-OT | 8.00% |
| CGZP-3-OT | 4.00% |

Example 99

| | |
|---|---|
| CCH-301 | 7.00% |
| CCH-501 | 14.00% |
| CCOC-3-3 | 3.00% |
| CCOC-3-5 | 3.00% |
| CCOC-4-3 | 4.00% |
| CCZU-2-F | 5.00% |
| CCZU-3-F | 15.00% |
| CCZU-5-F | 4.00% |
| CDU-2-F | 9.00% |
| CDU-3-F | 9.00% |
| CDU-5-F | 5.00% |
| CCQU-2-F | 7.00% |
| CCQU-3-F | 8.00% |
| CCQU-5-F | 7.00% |

Example 100

| | | | |
|---|---|---|---|
| CGU-2-F | 5.00% | S → N [° C.]: | <−40.0 |
| CCZU-2-F | 4.00% | Clearing point [° C.]: | +78.5 |
| CCZU-3-F | 14.00% | Δn [589 nm, 20° C.]: | +0.0809 |
| CCZU-5-F | 4.00% | d · Δn [20° C.]: | 0.50 |
| CCQU-2-F | 10.00% | Twist [°]: | 90 |
| CCQU-3-F | 12.00% | $V_{10}$ [V]: | 0.90 |
| CCQU-5-F | 5.00% | | |
| CDU-2-E | 10.00% | | |
| CDU-3-F | 12.00% | | |
| CDU-5-F | 6.00% | | |
| CGZP-2-OT | 12.00% | | |
| CGZP-3-OT | 6.00% | | |

Example 101

| | | | |
|---|---|---|---|
| CC-3-V1 | 4.00% | S → N [° C.]: | <−40.0 |
| CCH-35 | 5.00% | Clearing point [° C.]: | +71.5 |
| CC-5-V | 17.00% | Δn [589 nm, 20° C.]: | +0.0772 |
| CCH-3CF$_3$ | 4.00% | $γ_1$ [20° C., mPa · s]: | 96 |
| CCQU-2-F | 10.00% | d · Δn [20° C.]: | 0.50 |
| CCQU-3-F | 9.00% | Twist [°]: | 90 |
| CCP-2F.F.F | 4.00% | $V_{10}$ [V]: | 1.29 |
| CGU-2-F | 9.00% | | |
| CGU-3-F | 6.00% | | |
| CCZU-2-F | 4.00% | | |
| CCZU-3-F | 14.00% | | |
| CGZP-2-OT | 9.00% | | |
| CGZP-3-OT | 5.00% | | |

Example 102

| | | | |
|---|---|---|---|
| CCP-2F.F.F | 11.00% | S → N [° C.]: | <−40.0 |
| CCP-3F.F.F | 12.00% | Clearing point [° C.]: | +79.0 |
| CCP-5F.F.F | 4.00% | Δn [589 nm, 20° C.]: | +0.0804 |
| CGU-2-F | 8.00% | $γ_1$ [20° C., mPa · s]: | 177 |
| CGU-3-F | 4.00% | d · Δn [20° C.]: | 0.50 |
| CCZU-2-F | 5.00% | Twist [°]: | 90 |
| CCZU-3-F | 14.00% | $V_{10}$ [V]: | 1.00 |
| CCZU-5-F | 4.00% | | |
| CCQU-2-F | 10.00% | | |
| CCQU-3-F | 12.00% | | |
| CCQU-5-F | 8.00% | | |
| CGZP-2-OT | 8.00% | | |

Example 103

| | |
|---|---|
| CCP-2F.F.F | 8.00% |
| CCP-3F.F.F | 4.00% |
| CCZU-2-F | 5.00% |
| CCZU-3-F | 14.00% |
| CGU-2-F | 7.00% |
| CGZP-2-OT | 10.00% |
| CGZP-3-OT | 5.00% |
| CCQU-2-F | 9.00% |

-continued

| | |
|---|---|
| CCQU-3-F | 12.00% |
| CCQU-5-F | 6.00% |
| CDU-2-F | 10.00% |
| CDU-3-F | 10.00% |

Example 104

| | |
|---|---|
| CC-5-V | 18.00% |
| CCH-3-CF$_3$ | 5.00% |
| CCQU-2-F | 9.00% |
| CCQU-3-F | 9.00% |
| CCQU-5-F | 5.00% |
| CCP-2F.F.F | 9.00% |
| CCP-3F.F.F | 4.00% |
| CCG-V-F | 5.00% |
| CGU-2-F | 9.00% |
| CCZU-2-F | 3.00% |
| CCZU-3-F | 13.00% |
| CGZP-2-OT | 11.00% |

Example 105

| | | | |
|---|---|---|---|
| CC-3-V1 | 4.00% | S → N [° C.]: | <+40.0 |
| CC-5-V | 17.00% | Clearing point [° C.]: | −69.0 |
| CCH-3CF$_3$ | 6.00% | Δn [589 nm, 20° C.]: | +0.0738 |
| CCQU-2-F | 9.00% | $γ_1$ [20° C., mPa · s]: | 97 |
| CCQU-3-F | 10.00% | d · Δn [20° C.]: | 0.50 |
| CCQU-5-F | 5.00% | Twist [°]: | 90 |
| CCP-2.F.F.F | 10.00% | $V_{10}$ [V]: | 1.22 |
| BCH-3F.F.F | 2.50% | | |
| CGU-2-F | 8.50% | | |
| CCZU-2-F | 3.00% | | |
| CCZU-3-F | 14.00% | | |
| CGZP-2-OT | 9.00% | | |
| CGZP-3-OT | 2.00% | | |

What is claimed is:

1. A liquid-crystalline medium containing a mixture of polar compounds having positive dielectric anisotropy, said medium comprising one or more alkenyl compounds of formula I

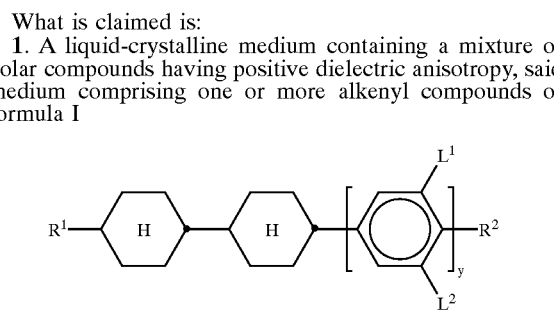

and one or more compounds of formula IA wherein:

R is a halogenated or unsubstituted alkyl or alkoxy radical having 1 to 15 carbon atoms, where one or more $CH_2$ groups in these radicals are optionally, in each case independently of one another, replaced by —C≡C—, —CH═CH—, —O—, —CO—O— or —O—CO— in such a way that O atoms are not linked directly to one another, $R^1$ is an alkenyl radical having 2 to 7 carbon atoms, $R^2$ is a halogenated or unsubstituted alkyl or alkoxy radical having 1 to 15 carbon atoms, where one or more $CH_2$ groups in these radicals are optionally, in each case independently of one another, replaced by —C≡C—, —CH═CH—, —O—, —CO—O— or —O—CO— in such a way that O atoms are not linked directly to one another or, if y is 1 or 2, $R^2$ can also Q—Y, Q is $CF_2$, $OCF_2$, CFH, OCFH, $OCHFCF_2$, $OCF_2CHFCF_2$ or a single bond, Y is F or Cl, X is F, Cl, CN, or a halogenated alkyl radical, a halogenated alkenyl radical, a halogenated alkoxy radical or a halogenated alkenyloxy radical, in each case having up to 6 carbon atoms, $Z^1$ and $Z^2$ are each, independently of one another, $-CF_2O-$, $-OCF_2-$ or a single bond, where, if z=1, $Z^1 \neq Z^2$, and if z=0, $Z^1$ is $-CF_2O-$ or $-OCF_2-$,

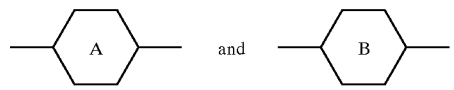

are each, independantly of one another,

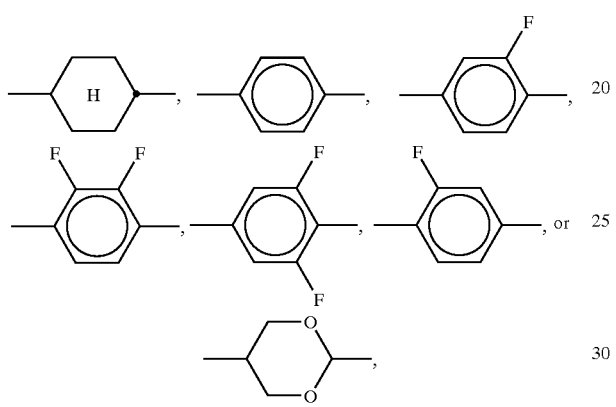

y is 0, 1 or 2, z is 0 or 1, and $L^1$, $L^2$, $L^3$ and $L^4$ are each, independently of one another, H or F, and wherein said medium does not contain cyanophenylcyclohexanes.

2. A medium according to claim 1, wherein said medium comprises one or more compounds of the following formulae:

I-1a

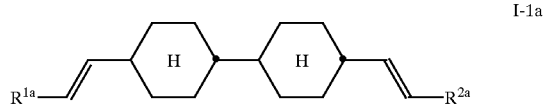

I-1b

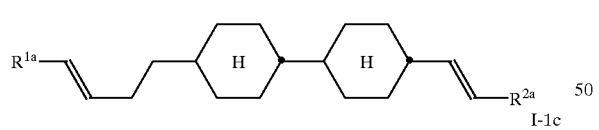

I-1c

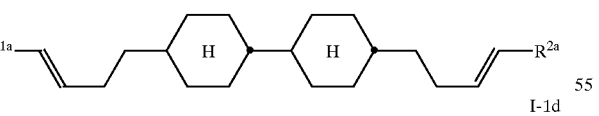

I-1d

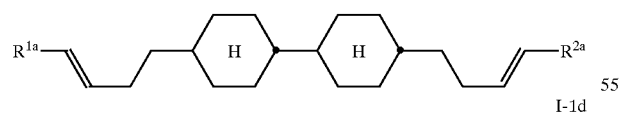

I-1e

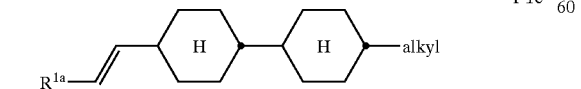

in which $R^{1a}$ and $R^{2a}$ are each, independently of one another, H, $CH_3$, $C_2H_5$ or $n-C_3H_7$, and "alkyl" is an alkyl group having 1 to 7 carbon atoms.

3. A medium according to claim 1, wherein said medium comprises one, two or more compounds of the formulae IA1–IA15:

IA-1

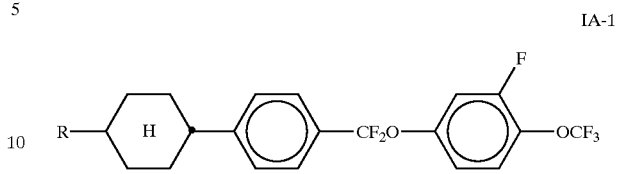

IA-2

IA-3

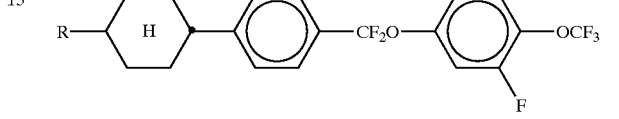

IA-4

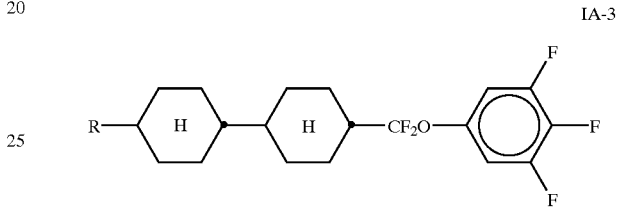

IA-5

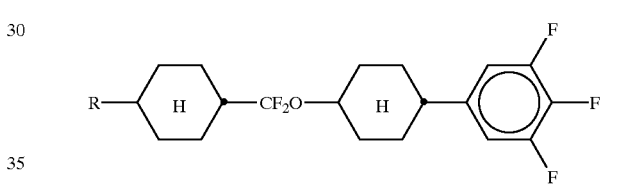

IA-6

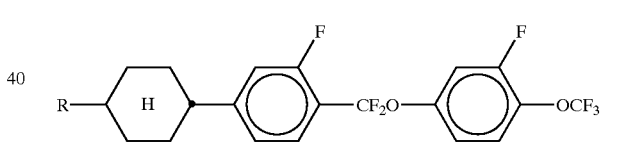

IA-7

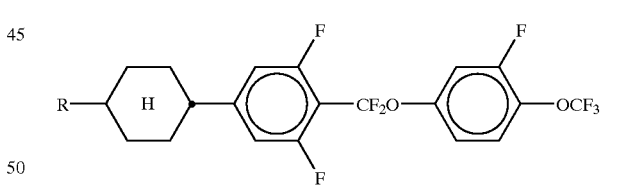

IA-8

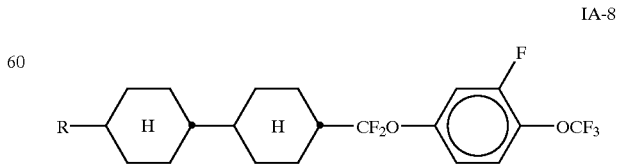

-continued

IA-9
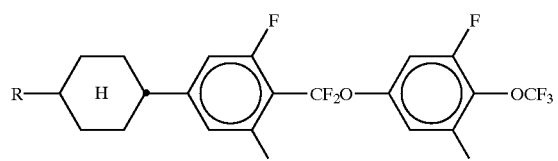

IA-10
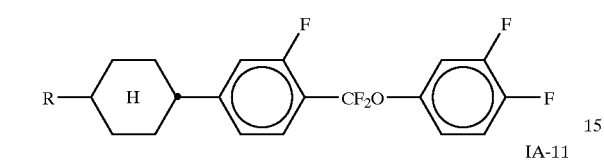

IA-11
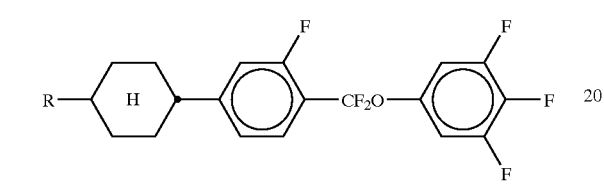

IA-12
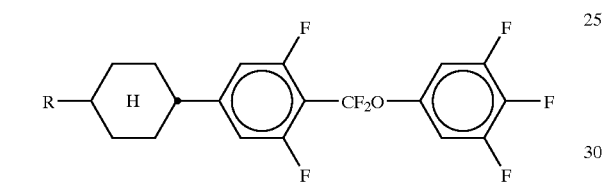

IA-13
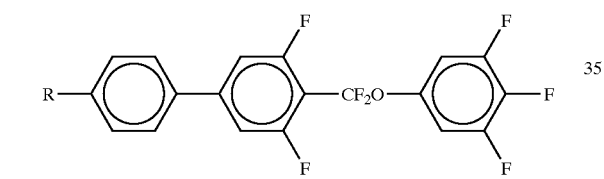

IA-14
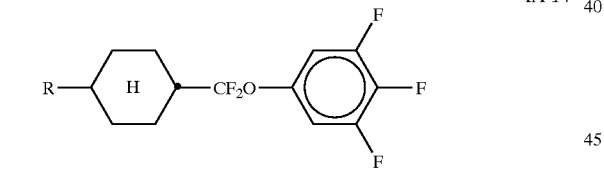

IA-15
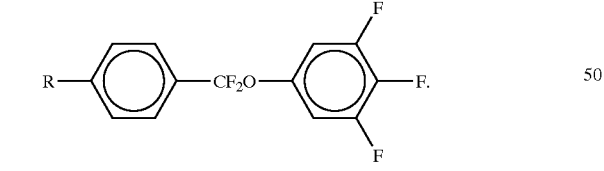

4. A medium according to claim 1, wherein said medium additionally comprises one or more compounds selected from formulae II, III, IV, V and VI:

II
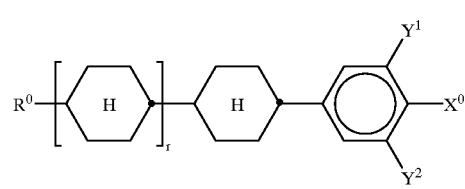

-continued

III
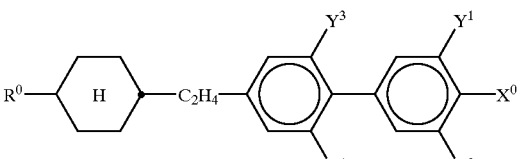

IV
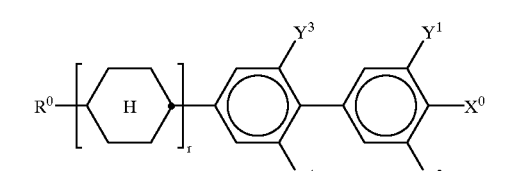

V
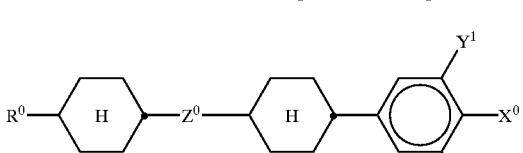

VI
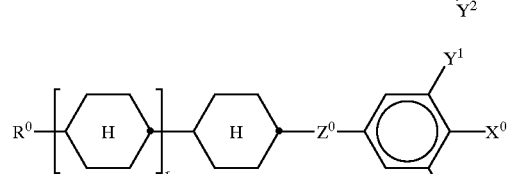

wherein:

$R^0$ is n-alkyl, oxaalkyl, fluoroalkyl or alkenyl, in each case having up to 9 carbon atoms, $X^0$ is F, Cl, or halogenated alkyl, alkenyl or alkoxy, in each case having up to 6 carbon atoms, $Z^0$ is —$C_2F_4$—, —$C_2H_4$—, —$(CH_2)_4$—, —$OCH_2$— or —$CH_2O$—, $Y^1$, $Y^2$, $Y^3$ and $Y^4$ are each, independently of one another, H or F, and r is 0 or 1.

5. A medium according to claim 4, wherein the proportion of compounds of formulae IA and I to VI together in the total mixture is at least 50% by weight.

6. A medium according to claim 1, wherein said medium additionally comprises one or more compounds of formulae Ea to Ed Ea
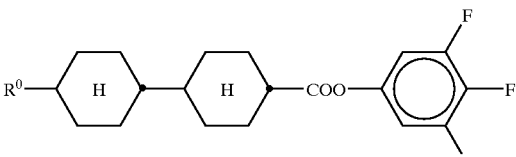

Eb
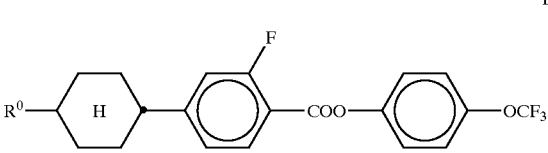

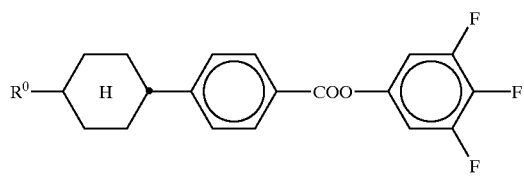

Ec

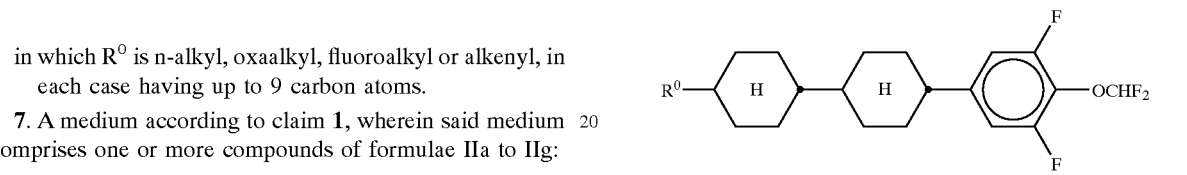

IIe, IIf, IIg

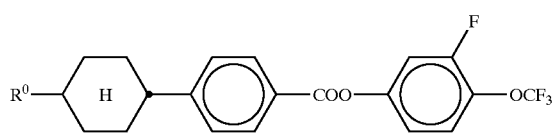

Ed in which R⁰ is n-alkyl, oxaalkyl, fluoroalkyl or alkenyl, in each case having up to 9 carbon atoms.

7. A medium according to claim 1, wherein said medium comprises one or more compounds of formulae IIa to IIg:

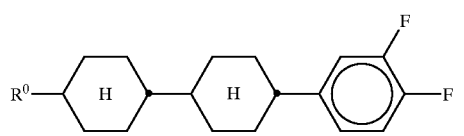

IIa

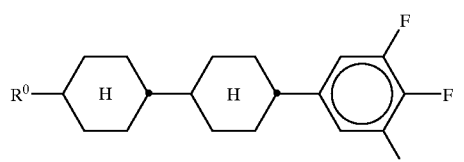

IIb

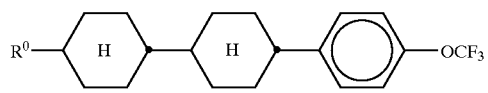

IIc

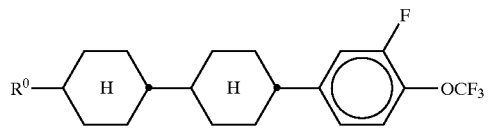

IId in which $R^0$ is n-alkyl, oxaalkyl, fluoroalkyl or alkenyl, in each case having up to 9 carbon atoms.

8. A medium according to claim 1, wherein the proportion of compounds of formula IA in the total mixture is from 10 to 50% by weight.

9. In a method of generating an electro-optical effect using a liquid-crystalline medium, the improvement wherein said medium is a medium according to claim 1.

10. An electro-optical liquid-crystal display containing a liquid-crystalline medium according to claim 1.

11. A medium according to claim 1, wherein X is F, Cl, or a halogenated alkyl radical, a halogenated alkenyl radical, a halogenated alkoxy radical or a halogenated alkenyloxy radical, in each case having up to 6 carbon atoms.

12. A medium according to claim 1, wherein the proportion of compounds of the formula IA in the total mixture is ≧20% by weight.

13. A medium according to claim 6, wherein the proportion of compounds of formulae Ea to Ed is 10 to 30% by weight.

14. A medium according to claim 4, wherein said medium additionally comprises one or more compounds selected formulae VII to XIII:

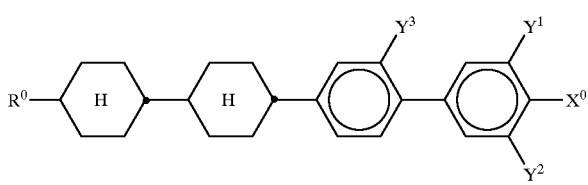

VII

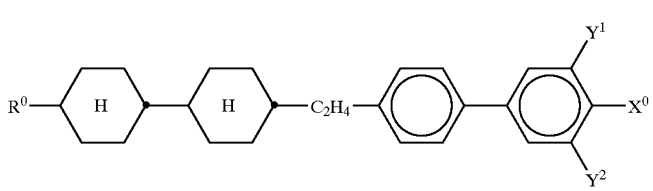

VIII

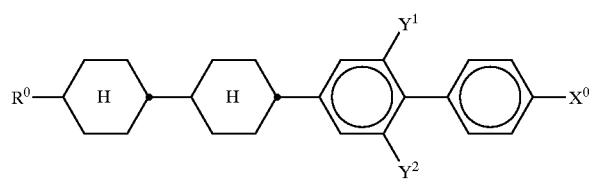

IX

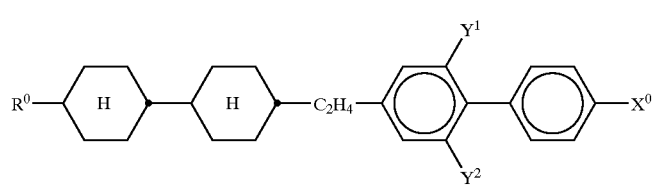

X

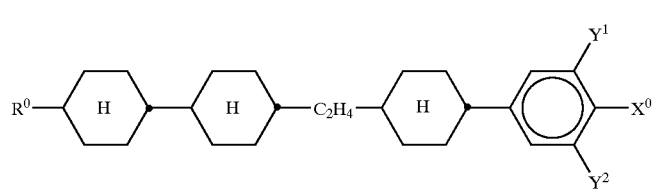

XI

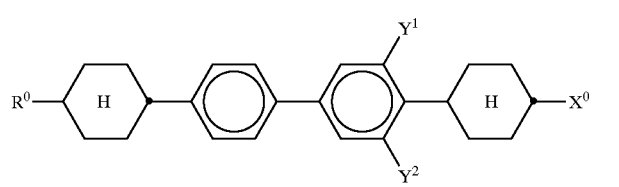

XII

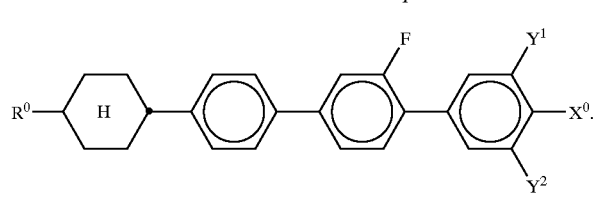

XIII

15. A medium according to claim 1, wherein the proportion of compounds of formula I in the total mixture is 0.05 to 40% by weight.

16. A medium according to claim 1, wherein the proportion of compounds of formula IA in the total mixture is 15 to 40% by weight.

17. A medium according to claim 4, wherein the proportion of compounds of formulae II to VI in the total mixture is 30 to 80% by weight.

18. A medium according to claim 1, wherein said medium does not contain cyano compounds.

19. A medium according to claim 1, wherein said medium contains at least one compound of formula I-3

I-3

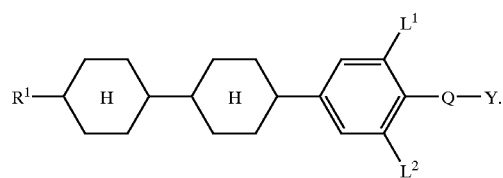

20. A medium according to claim 19, wherein, in said at least one compound of formula I-3, at least one of $L^1$ and $L^2$ is F and Q—Y is F or $OCF_3$.

21. A medium according to claim 19, wherein, in said at least one compound of formula I-3, $R^1$ is 1E-alkenyl or 3E-alkenyl having 2 to 7 carbon atoms.

22. A medium according to claim 20, wherein, in said at least one compound of formula I-3, $R^1$ is 1E-alkenyl or 3E-alkenyl having 2 to 7 carbon atoms.

23. A medium according to claim 4, wherein said medium contains at least one compound of formula IV selected from subformula IVa–IVe IVa

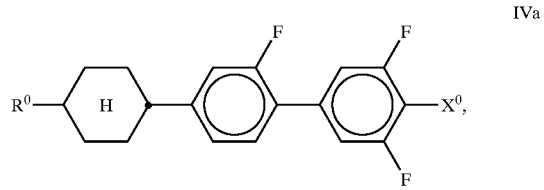

IVb

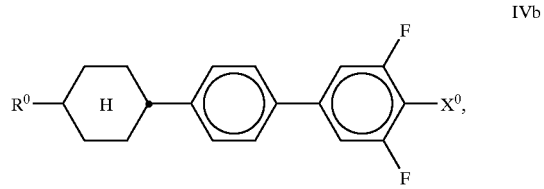

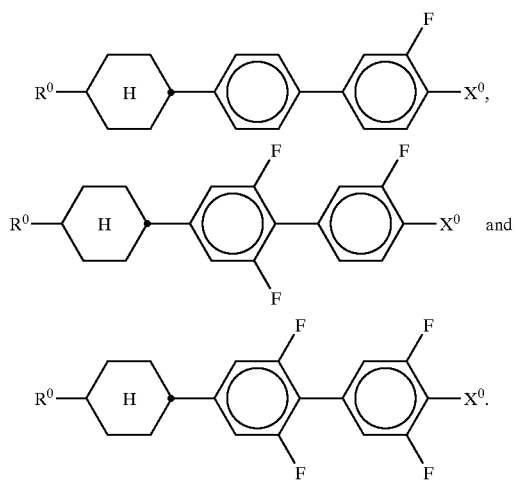

24. A medium according to claim 23, wherein said medium contains 5 to 35% by weight of compounds IVa.

25. A medium according to claim 23, wherein said medium contains one, two or three compounds of formula IVa, in which $X^0$ is F or $OCF_3$.

26. A medium according to claim 14, wherein the proportion of compounds of formulae IA and I to VI together in the total mixture is at least 50% by weight;

27. A medium according to claim 14, wherein, in said one or more compounds of formulae VII to XIII, $X^0$ is F, Cl, $CF_3$, $OCF_3$ or $OCHF_2$ and $R^0$ is alkyl, oxaalkyl, fluoroalkyl or alkenyl, in each case having up to 6 carbon atoms.

28. A medium according to claim 14, wherein, in said medium consists essentially of compounds of formulae IA, I to VI and XIII.

29. A medium according to claim 4, wherein $X^0$ is F, $OCF_3$, $OCHF_2$, F, $OCH=CF_2$, $OCF=CF_2$ or $OCF_2$—$CF_2H$.

* * * * *

UNITED STATES PATENT AND TRADEMARK OFFICE
CERTIFICATE OF CORRECTION

PATENT NO. : 7,001,646 B2  Page 1 of 1
APPLICATION NO. : 10/168335
DATED : February 21, 2006
INVENTOR(S) : Michael Heckmeier et al.

It is certified that error appears in the above-identified patent and that said Letters Patent is hereby corrected as shown below:

Column 50, line 67 and 68, read "also Q—Y," should read -- also be Q—Y --
Column 51, line 15, reads "independantly of" should read -- independently of --
Column 56, line 44 and 45, read "selected formulae" should read -- selected from formulae --
Column 60, line 2, reads "compounds IVa" should read -- compounds of IVa --
Column 60, line 4, reads "tbree compounds" should read --three compounds --
Column 60, line 14, reads "wherein, in said" should read -- wherein said --

Signed and Sealed this

Thirty-first Day of October, 2006

JON W. DUDAS
*Director of the United States Patent and Trademark Office*